United States Patent
Powell et al.

(10) Patent No.: US 9,265,073 B2
(45) Date of Patent: Feb. 16, 2016

(54) SYSTEM AND METHOD FOR DUAL MODE COMMUNICATION

(75) Inventors: Mark Powell, San Jose, CA (US); Rajiv H. Patel, Newark, CA (US); Puneet Goel, Santa Clara, CA (US); Jeffrey Brown, Los Altos Hills, CA (US)

(73) Assignee: Kineto Wireless, LLC, Richardson, TX (US)

( * ) Notice: Subject to any disclaimer, the term of this patent is extended or adjusted under 35 U.S.C. 154(b) by 627 days.

(21) Appl. No.: 12/977,037

(22) Filed: Dec. 22, 2010

(65) Prior Publication Data

US 2011/0286343 A1    Nov. 24, 2011

Related U.S. Application Data

(60) Provisional application No. 61/347,376, filed on May 21, 2010.

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04W 4/00* | (2009.01) |
| *H04W 76/02* | (2009.01) |

(Continued)

(52) U.S. Cl.
CPC .......... *H04W 76/02* (2013.01); *H04M 2250/06* (2013.01); *H04W 8/183* (2013.01); *H04W 36/14* (2013.01); *H04W 48/18* (2013.01); *H04W 52/0264* (2013.01); *H04W 88/06* (2013.01)

(58) Field of Classification Search
CPC ..... H04W 76/02; H04W 36/14; H04W 48/18; H04M 2250/06
USPC ................................... 370/252, 331
See application file for complete search history.

(56) References Cited

U.S. PATENT DOCUMENTS

| 5,406,615 A | 4/1995 | Miller, II et al. |
|---|---|---|
| 5,448,619 A | 9/1995 | Evans et al. |

(Continued)

FOREIGN PATENT DOCUMENTS

| EP | 1207708 | 10/2004 |
|---|---|---|
| EP | 1556958 | 7/2005 |

(Continued)

OTHER PUBLICATIONS

Portions of prosecution history of U.S. Appl. No. 10/688,470, Jul. 19, 2006, Gallagher, Michael D., et al.

(Continued)

*Primary Examiner* — Shripal Khajuria
*Assistant Examiner* — Farhad Ali
(74) *Attorney, Agent, or Firm* — Norton Rose Fulbright US LLP

(57) ABSTRACT

Wi-Fi setup application and path switching applications are provided to allow commands received from native applications of the UE to be redirected to a Wi-Fi engine. The Wi-Fi engine supports circuit switched and packet switched services over a Wi-Fi connection, thus allowing commands received from native applications on a UE to connect the user to either a wireless unlicensed communication system or a wireless licensed communication system.

20 Claims, 26 Drawing Sheets

(51) Int. Cl.
*H04W 8/18* (2009.01)
*H04W 36/14* (2009.01)
*H04W 48/18* (2009.01)
*H04W 52/02* (2009.01)
*H04W 88/06* (2009.01)

(56) References Cited

U.S. PATENT DOCUMENTS

| | | | |
|---|---|---|---|
| 5,659,878 | A | 8/1997 | Uchida et al. |
| 5,724,658 | A | 3/1998 | Hasan et al. |
| 5,870,677 | A | 2/1999 | Takahashi et al. |
| 5,995,828 | A | 11/1999 | Nishida |
| 6,101,176 | A | 8/2000 | Honkasalo et al. |
| 6,226,515 | B1 | 5/2001 | Pauli et al. |
| 6,327,470 | B1 | 12/2001 | Ostling |
| 6,381,457 | B1 | 4/2002 | Carlsson et al. |
| 6,389,059 | B1 | 5/2002 | Smith et al. |
| 6,542,516 | B1 | 4/2003 | Vialen et al. |
| 6,785,535 | B2 | 8/2004 | Lucidarme et al. |
| 6,801,777 | B2 | 10/2004 | Rusch |
| 6,826,154 | B2 | 11/2004 | Subbiah et al. |
| 6,925,074 | B1 | 8/2005 | Vikberg et al. |
| 6,993,359 | B1 | 1/2006 | Nelakanti et al. |
| 7,009,952 | B1 | 3/2006 | Razavilar et al. |
| 7,107,055 | B2 | 9/2006 | Gallagher et al. |
| 7,127,250 | B2 | 10/2006 | Gallagher et al. |
| 7,324,818 | B2 | 1/2008 | Gallagher et al. |
| 7,565,145 | B2 | 7/2009 | Gallagher et al. |
| 2002/0085516 | A1 | 7/2002 | Bridgelall |
| 2002/0102974 | A1 | 8/2002 | Raith |
| 2002/0131387 | A1 | 9/2002 | Pitcher et al. |
| 2002/0132630 | A1 | 9/2002 | Arazi et al. |
| 2002/0147016 | A1 | 10/2002 | Arazi et al. |
| 2003/0026269 | A1 | 2/2003 | Paryani |
| 2003/0119489 | A1 | 6/2003 | Mohammed |
| 2004/0053623 | A1 | 3/2004 | Hoff et al. |
| 2004/0068571 | A1 | 4/2004 | Ahmavaara |
| 2004/0072593 | A1 | 4/2004 | Robbins et al. |
| 2004/0082366 | A1 | 4/2004 | Longoni et al. |
| 2004/0203815 | A1 | 10/2004 | Shoemake et al. |
| 2005/0025182 | A1* | 2/2005 | Nazari .......................... 370/469 |
| 2005/0239441 | A1 | 10/2005 | Eronen |
| 2005/0265279 | A1 | 12/2005 | Markovic et al. |
| 2006/0094431 | A1 | 5/2006 | Saifullah et al. |
| 2006/0099935 | A1* | 5/2006 | Gallagher et al. ......... 455/414.1 |
| 2006/0293066 | A1 | 12/2006 | Edge et al. |
| 2008/0039086 | A1 | 2/2008 | Gallagher et al. |
| 2008/0137612 | A1 | 6/2008 | Gallagher et al. |
| 2009/0190550 | A1* | 7/2009 | Giustina et al. ............... 370/331 |

FOREIGN PATENT DOCUMENTS

| | | |
|---|---|---|
| EP | 2334137 | 6/2011 |
| WO | WO 99/57876 | 11/1999 |
| WO | WO 99/67967 | 12/1999 |
| WO | WO 00/76243 | 12/2000 |
| WO | WO 00/79816 | 12/2000 |
| WO | WO 02/062094 | 8/2002 |

OTHER PUBLICATIONS

Portions of prosecution history of U.S. Appl. No. 11/227,573, Nov. 2, 2007, Gallagher, Michael D., et al.

Portions of prosecution history of U.S. Appl. No. 11/227,841, May 4, 2006, Gallagher, Michael D., et al.

Portions of prosecution history of U.S. Appl. No. 11/927,638, Apr. 10, 2012, Gallagher, Michael D., et al.

Portions of prosecution history of EP03776436.2, Apr. 5, 2012 (mailing date), Kineto Wireless, Inc.

Portions of prosecution history of EP11155477.0, Jun. 19, 2013 (mailing date), Kineto Wireless, Inc.

Author Unknown, "Generic Access Network," Feb. 12, 2010, 5 pages, Wikipedia.

* cited by examiner

SYSTEM AND METHOD FOR DUAL MODE COMMUNICATION

CLAIM OF BENEFIT TO PRIOR APPLICATIONS

This application claims the benefit of U.S. Provisional Application 61/347,376, entitled "System and Method for Dual Mode Communication," filed May 21, 2010. U.S. Provisional Application 61/347,376 is hereby incorporated by reference.

BACKGROUND

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station equipment is used to support communications on licensed frequencies. Base stations are typically installed approximately a mile apart from one another (e.g., cellular towers in a cellular network). The wireless transport mechanisms and frequencies employed by typical licensed wireless systems limit both data transfer rates and range. As a result, the quality of service (voice quality and speed of data transfer) in licensed wireless systems is considerably inferior to the quality of service afforded by landline (wired) connections. Thus, the user of a licensed wireless system pays relatively high fees for relatively low quality service.

Landline (wired) connections are extensively deployed and generally perform at a lower cost with higher quality voice and higher speed data services. The problem with landline connections is that they constrain the mobility of a user. Traditionally, a physical connection to the landline was required.

In recent years, the use of unlicensed wireless communication systems to facilitate mobile access to landline-based networks has seen rapid growth. For example, such unlicensed wireless systems may support wireless communication based on the IEEE 802.11a, b or g standards (Wi-Fi), or the Bluetooth® standard. The mobility range associated with such systems is typically on the order of 100 meters or less. A typical unlicensed wireless communication system includes a base station comprising a wireless access point with a physical connection (e.g., coaxial, twisted pair, or optical cable) to a landline-based network. The access point has a radio frequency (RF) transceiver to facilitate communication with a wireless user equipment (UE) that is operative within a modest distance of the access point. The data transport rates supported by the Wi-Fi and Bluetooth® standards are much higher than those supported by the aforementioned licensed wireless systems. Thus, this option provides higher quality services at a lower cost, but the services only extend a modest distance from the base station.

Currently, technology is being developed to integrate the use of licensed and unlicensed wireless systems in a seamless fashion. Thus enabling a user to access, via a single UE, an unlicensed wireless system when within the range of such a system, while accessing a licensed wireless system when out of range of the unlicensed wireless system. However, existing technology requires separate applications on the wireless UE for accessing the licensed and unlicensed wireless systems.

For example, a user accesses native applications (e.g., phone dialer, contacts list, and short messaging service) provided by the manufacturer of the wireless UE in order to establish a connection with the licensed wireless communication system. On the other hand, when the user wishes to connect to an unlicensed wireless communication system, the user must launch a third party application to connect to the unlicensed wireless communication system. These third party applications are standalone applications which include separate phone dialers, contact lists, etc., for connecting a user to an unlicensed wireless communication system. Thus, the user must retain duplicate contact lists and use a separate phone dialer each time the user wishes to establish a communications connection with the unlicensed wireless communication system. Furthermore, these applications employ a separate user identity (e.g., a separate phone number) to authorize the user to use the unlicensed wireless communication system.

BRIEF SUMMARY

Some embodiments provide a method and system for allowing a user of a mobile station (or user equipment, UE) to use a single identity (e.g., same phone number) when accessing licensed or unlicensed wireless communications networks over cellular frequencies or through wireless connections to the Internet (e.g., Wi-Fi). Some embodiments integrate a Wi-Fi setup application in the UE. The Wi-Fi setup application uses a single subscriber identity for accessing both the unlicensed and licensed wireless communication networks. In some embodiments, the Wi-Fi setup application uses existing native user interface applications (e.g., phone dialer, contacts list, and short messaging services) provided by the UE manufacturer. In some embodiments the Wi-Fi setup application is pre-loaded into the UE. In other embodiments, the Wi-Fi setup application is downloaded and installed on the UE.

Some embodiments accomplish integrating the Wi-Fi setup application with existing native applications by providing path switches in the operating system of the UE. These path switches allow commands received from native applications of the UE to be redirected to an unlicensed radio interface. The unlicensed radio interface supports circuit switched and packet switched services over a Wi-Fi connection, thus allowing commands received from native applications on a UE to connect the user to either a wireless unlicensed communication system or a wireless licensed communication system. Some embodiments of the unlicensed radio interface provide for automatic network selection for connecting to either a wireless licensed communication network or a wireless unlicensed communication network. Other embodiments allow the user to determine which network the user wishes to access (i.e. licensed or unlicensed communication networks).

In accordance with some embodiments of the present invention, a method for mobile communication is described herein. The method generates radio interface layer (RIL) commands in response to a call command from a native dialer application of a mobile device. The RIL commands may include a subscriber identity and commands to cause a cellular RIL of the mobile device to establish a connection with a core network via a licensed wireless communication network. The method then diverts the RIL commands to an unlicensed wireless radio client. Next, the method establishes a connection with the core network via an unlicensed wireless communication network using the subscriber identity and the diverted RIL commands.

The method repackages the diverted RIL commands into commands for establishing communication with the unlicensed wireless communication network in some embodiments. In some embodiments, the unlicensed wireless radio client is a generic access network (GAN) client. The GAN client is configured to i) perform non access stratum functions, ii) establish an IPSec tunnel to a network controller of the second unlicensed wireless communication network, and 3) transfer data between the access point and the GAN client over the established IPSec tunnel using TCP/IP protocols.

The method also monitors the signal quality of the connection with the unlicensed wireless communication network in some embodiments. When the signal quality is below a certain threshold, the method commences the handover procedure. The handover procedure includes the process of obtaining a list of cell identities of a service area of the licensed wireless communication network directly from the first RIL of the mobile device without communicating with an access mode switch in some embodiments. The handover procedure also includes sending a channel mode, a ciphering code, and a cell identity from the list of cell identities to the core network via the unlicensed wireless communication network in some embodiments.

The handover procedure then sends a handover request to the core network via the unlicensed wireless communication network. The handover request includes a request to establish a communication channel using the channel mode and the ciphering code in some embodiments. In response to the handover request, a handover confirmation is received from the core network via the unlicensed wireless communication network in some embodiments.

Some embodiments provide a computer readable medium that stores a computer program that is executable by a processing unit to establish communication with the core network using either a cellular radio access technology (RAT) or a GAN RAT. The computer program includes sets of instructions for generating radio interface layer (RIL) commands in response to a call command from a native dialer application of a mobile device. In some embodiments, the RIL commands includes a subscriber identity and commands to cause a first RIL of the mobile device to establish a connection with a core network via a licensed wireless communication network. The computer program also includes sets of instructions for diverting the RIL commands to an unlicensed wireless radio client and establishing a connection with the core network via an unlicensed wireless communication network using the subscriber identity and the diverted RIL commands.

In accordance with yet other embodiments of the present invention, a mobile communication device is provided. The mobile device includes a dialer application, a RIL switch, and an unlicensed wireless radio module. The dialer application is configured to send radio interface layer (RIL) commands to a first RIL of the device. The RIL commands include a subscriber identity and commands to cause a cellular RIL of the mobile device to establish a connection with a core network via a licensed wireless communication network.

The RIL switch is configured to divert the RIL commands to an unlicensed wireless radio client. The unlicensed wireless radio module is configured to establish a connection with the core network via a second unlicensed wireless communication network using the subscriber identity and the diverted RIL commands.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
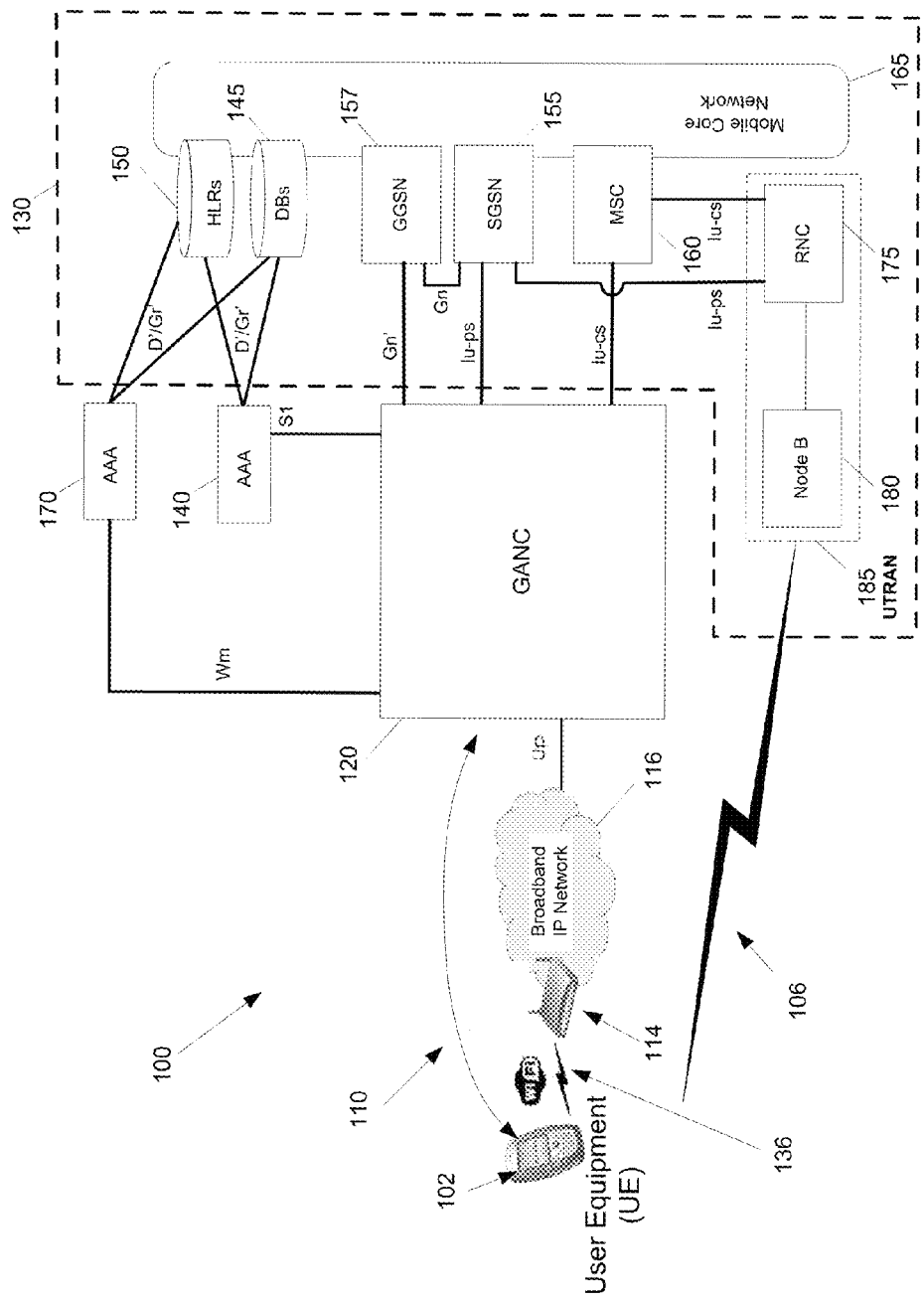
FIG. 1 illustrates an integrated communication system (ICS) of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Throughout the following description, acronyms commonly used in the telecommunications industry for wireless services are utilized along with acronyms specific to the present invention. A table of acronyms used in this application is included in Section VIII.

Some embodiments provide a method of operating a user equipment (UE) in a communication system that includes a licensed wireless communication system and an unlicensed wireless communication system such as a generic access network (GAN). Some embodiments of the inventions are implemented on UEs that are dual mode UEs. Dual mode UEs typically include two radios, a radio operating in licensed frequencies and a radio operating in unlicensed frequencies. In this specification, the terms licensed, licensed radio, and licensed frequencies are used interchangeable with cellular, cellular radio, and cellular frequency respectively. The term unlicensed radio refers to an IEEE 802.11 (Wi-Fi) radio, Bluetooth® radio, or similar radios operating in frequencies that are not licensed by the governments. The cellular radio is used to communicate with a wide area cellular network over cellular frequencies. When within range of a Wi-Fi connection, the Wi-Fi radio is used to communicate data over an unlicensed wireless frequency connection. In some embodiments a dual mode UE is also able to receive cellular voice and data services over a broadband service through the Wi-Fi connection. Access to cellular services through a broadband connection is referred to as unlicensed Mobile Access (UMA).

Some embodiments provide a method and system for allowing a user of a mobile station (or user equipment, UE) to use a single identity (e.g., same phone number) when accessing licensed or unlicensed wireless communications networks over cellular frequencies or through wireless connections to the Internet (e.g., Wi-Fi). Some embodiments integrate a Wi-Fi setup application in the UE. The Wi-Fi setup application uses a single subscriber identity for accessing both the unlicensed and licensed wireless communication networks. In some embodiments, the Wi-Fi setup application uses existing native user interface applications (e.g., phone dialer, contacts list, and short messaging services) provided by the UE manufacturer. In some embodiments the Wi-Fi setup application is pre-loaded into the UE. In other embodiments, the Wi-Fi setup application is downloaded and installed on the UE.

Some embodiments accomplish integrating the Wi-Fi setup application with existing native applications by providing path switches in the operating system of the UE. These path switches allow commands received from native applications of the UE to be redirected to an unlicensed radio interface. The unlicensed radio interface supports circuit switched and packet switched services over a Wi-Fi connection, thus allowing commands received from native applications on a UE to connect the user to either a wireless unlicensed communication system or a wireless licensed communication system. Some embodiments of the unlicensed radio interface provide for automatic network selection for connecting to either a wireless licensed communication network or a wireless unlicensed communication network. Other embodiments allow the user to determine which network the user wishes to access (i.e. licensed or unlicensed communication networks).

In accordance with some embodiments of the present invention, a method for mobile communication is described herein. The method generates radio interface layer (RIL) commands in response to a call command from a native dialer application of a mobile device. The RIL commands may include a subscriber identity and commands to cause a cellular RIL of the mobile device to establish a connection with a core network via a licensed wireless communication network. The method then diverts the RIL commands to an unlicensed wireless radio client. Next, the method establishes a connection with the core network via an unlicensed wireless communication network using the subscriber identity and the diverted RIL commands.

The method repackages the diverted RIL commands into commands for establishing communication with the unlicensed wireless communication network in some embodiments. In some embodiments, the unlicensed wireless radio client is a generic access network (GAN) client. The GAN client is configured to i) perform non access stratum functions, ii) establish an IPSec tunnel to a network controller of the second unlicensed wireless communication network, and 3) transfer data between the access point and the GAN client over the established IPSec tunnel using TCP/IP protocols.

The method also monitors the signal quality of the connection with the unlicensed wireless communication network in some embodiments. When the signal quality is below a certain threshold, the method commences the handover procedure. The handover procedure includes the process of obtaining a list of cell identities of a service area of the licensed wireless communication network directly from the first RIL of the mobile device without communicating with an access mode switch in some embodiments. The handover procedure also includes sending a channel mode, a ciphering code, and a cell identity from the list of cell identities to the core network via the unlicensed wireless communication network in some embodiments.

The handover procedure then sends a handover request to the core network via the unlicensed wireless communication network. The handover request includes a request to establish a communication channel using the channel mode and the ciphering code in some embodiments. In response to the handover request, a handover confirmation is received from the core network via the unlicensed wireless communication network in some embodiments.

Some embodiments provide a computer readable medium that stores a computer program that is executable by a processing unit to establish communication with the core network using either a cellular radio access technology (RAT) or a GAN RAT. The computer program includes sets of instructions for generating radio interface layer (RIL) commands in response to a call command from a native dialer application of a mobile device. In some embodiments, the RIL commands includes a subscriber identity and commands to cause a first RIL of the mobile device to establish a connection with a core network via a licensed wireless communication network. The computer program also includes sets of instructions for diverting the RIL commands to an unlicensed wireless radio client and establishing a connection with the core network via an unlicensed wireless communication network using the subscriber identity and the diverted RIL commands.

In accordance with yet other embodiments of the present invention, a mobile communication device is provided. The mobile device includes a dialer application, a RIL switch, and an unlicensed wireless radio module. The dialer application is configured to send radio interface layer (RIL) commands to a first RIL of the device. The RIL commands include a subscriber identity and commands to cause a cellular RIL of the mobile device to establish a connection with a core network via a licensed wireless communication network.

The RIL switch is configured to divert the RIL commands to an unlicensed wireless radio client. The unlicensed wireless radio module is configured to establish a connection with the core network via a second unlicensed wireless communication network using the subscriber identity and the diverted RIL commands.

Several more detailed embodiments of the invention are described in sections below. Specifically, Section I describes the overall integrated communication system in which some embodiments are incorporated. The discussion in Section I is followed by describing the use of a single user interface in a dual mode UE in Section II. Next, Section III describes using a single identity to access licensed and unlicensed services. Next, Section IV describes roving and handover between the licensed and unlicensed wireless system. Section V then describes the UE architecture of some embodiments. Next, a process for defining API and interfaces for a dual mode UE. Section VI describes a computer system which is used in some embodiments. Next Section VII presents the list of abbreviations used. Finally, Section VIII lists the abbreviations used.

I. Overall System

A. Integrated Communication Systems (ICS)

FIG. 1 illustrates an integrated communication system (ICS) architecture 100 in accordance with some embodiments of the present invention. ICS architecture 100 enables one or more user equipments (UEs) 102 to access a voice and data network 165 via either a licensed air interface 106 or an ICS interface 110 through which components of a mobile core network 165 are alternatively accessed. In some embodiments, a communication session includes voice services, data services, or both.

The mobile core network 165 includes one or more Home Location Registers (HLRs) 150 and databases 145 for subscriber authentication and authorization. Once authorized, the UE 102 may access the voice and data services of the mobile core network 165. In order to provide such services, the mobile core network 165 includes a mobile switching center (MSC) 160 for providing access to the voice services. Data services are provided for through a Serving GPRS (General Packet Radio Service) Support Node (SGSN) 155 in conjunction with a gateway such as the Gateway GPRS Support Node (GGSN) 157.

The SGSN 155 is typically responsible for delivering data packets from and to the GGSN 157 and the user equipment within the geographical service area of the SGSN 155. Additionally, the SGSN 155 may perform functionality such as mobility management, storing user profiles, and storing location information. However, the actual interface from the mobile core network 165 to various external data packet services networks (e.g., public Internet) is facilitated by the GGSN 157. As the data packets originating from the user equipment typically are not structured in the format with which to access the external data networks, it is the role of the GGSN 157 to act as the gateway into such packet services networks. In this manner, the GGSN 157 provides addressing for data packets passing to and from the UE 102 and the external packet services networks (not shown). Moreover, as the user equipment of a licensed wireless network traverses multiple service regions and thus multiple SGSNs, it is the role of the GGSN 157 to provide a static gateway into the external data networks.

Figure 3:
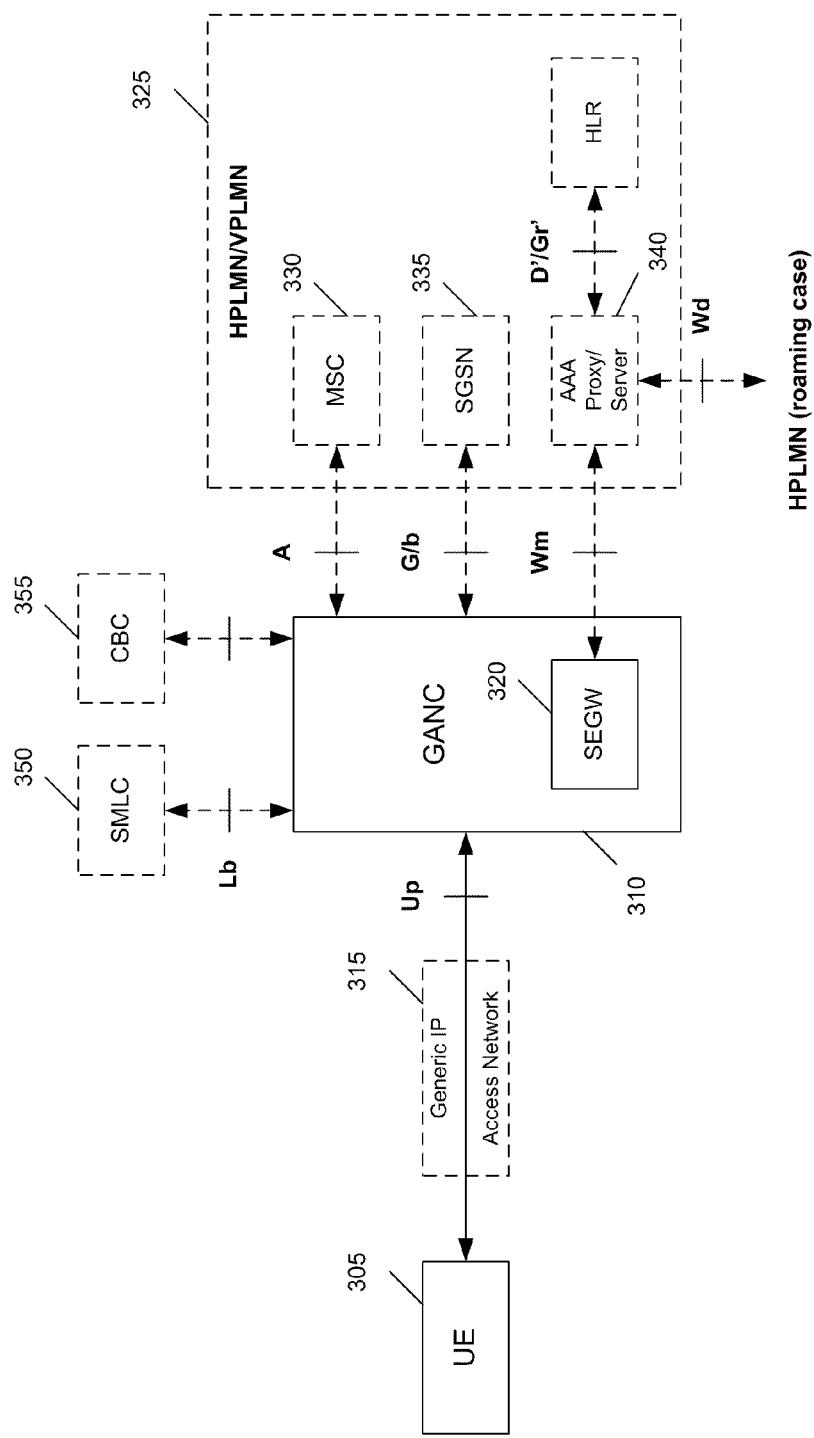
FIG. 3 illustrates the overall A/Gb-mode GAN functional architecture of some embodiments.

In the illustrated embodiment, components common to a UMTS Terrestrial Radio Access Network (UTRAN) based cellular network 185 are depicted that include multiple base stations referred to as Node Bs 180 (of which only one is shown for simplicity) that facilitate wireless communication services for various user equipments 102 via respective licensed radio links 106 (e.g., radio links employing radio frequencies within a licensed bandwidth). One of ordinary skill in the art will recognize that in some embodiments, the licensed wireless network may include other licensed wireless networks such as the GSM/EDGE Radio Access Network (GERAN). An example of a system using A and Gb interfaces to access GERAN is shown in FIG. 3 below.

The licensed wireless channel 106 may comprise any licensed wireless service having a defined UTRAN or GERAN interface protocol (e.g., Iu-cs and Iu-ps interfaces for UTRAN or A and Gb interfaces for GERAN) for a voice/data network. The UTRAN 185 typically includes at least one Node B 180 and a Radio Network Controller (RNC) 175 for managing the set of Node Bs 180. Typically, the multiple Node Bs 180 are configured in a cellular configuration (one per each cell) that covers a wide service area.

Each RNC 175 communicates with components of the core network 165 through a standard radio network controller interface such as the Iu-cs and Iu-ps interfaces depicted in FIG. 1. For example, a RNC 175 communicates with MSC 160 via the UTRAN Iu-cs interface for circuit switched voice services. Additionally, the RNC 175 communicates with SGSN 155 via the UTRAN Iu-ps interface for packet data services through GGSN 157. Moreover, one of ordinary skill in the art will recognize that in some embodiments, other networks with other standard interfaces may apply. For example, the RNC 175 in a GERAN network is replaced with a Base Station Controller (BSC) that communicates voice to the MSC 160 via an A interface and the BSC communicates data to the SGSN via a Gb interface of the GERAN network.

In some embodiments of the ICS architecture, the user equipment 102 use the services of the mobile core network (CN) 165 via a second communication network facilitated by the ICS access interface 110 and a Generic Access Network Controller (GANC) 120 (also referred to as a Universal Network Controller or UNC).

In some embodiments, the voice and data services over the ICS access interface 110 are facilitated via an access point 114 communicatively coupled to a broadband IP network 116. In some embodiments, the access point 114 is a generic wireless access point that connects the user equipment 102 to the ICS network through unlicensed wireless frequencies.

The signaling from the UE 102 is passed over the ICS access interface 110 to the GANC 120. After the GANC 120 performs authentication and authorization of the subscriber, the GANC 120 communicates with components of the mobile core network 165 using a radio network controller interface that is the same or similar to the radio network controller interface of the UTRAN described above, and includes a UTRAN Iu-cs interface for circuit switched voice services and a UTRAN Iu-ps interface for packet data services (e.g., GPRS). In this manner, the GANC 120 uses the same or similar interface to the mobile core network as a UTRAN Radio Network Subsystem (e.g., the Node B 180 and RNC 175).

In some embodiments, the GANC 120 communicates with other system components of the ICS system through one or more of several other interfaces, which are (1) "Up", (2) "Wm", (3) "D'/Gr'", (4) "Gn'", and (5) "S1". The "Up" interface is the interface between the UE 102 and the GANC 120. The "Wm" interface is a standardized interface between the GANC 120 and an Authorization, Authentication, and Accounting (AAA) Server 170 for authentication and authorization of the UE 102 into the ICS. The "D'/Gr'" interface is the standard interface between the AAA server 170 and the HLR 160. Optionally, some embodiments use the "Gn'" interface which is a modified interface for direct communications with the data services gateway (e.g., GGSN) of the core licensed network. Some embodiments optionally include the "S1" interface. In these embodiments, the "S1" interface provides an authorization and authentication interface from the GANC 120 to an AAA 140 server. In some embodiments, the AAA server 140 that supports the S1 interface and the AAA server 170 that supports Wm interface may be the same.

In some embodiments, the UE 102 must register with the GANC 120 prior to accessing ICS services. Registration information of some embodiments includes a subscriber's International Mobile Subscriber Identity (IMSI), a Media Access Control (MAC) address, and a Service Set Identifier (SSID) of the serving access point as well as the cell identity from the GSM or UTRAN cell upon which the UE 102 is already camped. In some embodiments, the GANC 120 may pass this information to the AAA server 140 to authenticate the subscriber and determine the services (e.g., voice and data) available to the subscriber. If approved by the AAA 140 for access, the GANC 120 will permit the UE 102 to access voice and data services of the ICS system.

These voice and data services are seamlessly provided by the ICS to the UE 102 through the various interfaces described above. In some embodiments, when data services are requested by the UE 102, the ICS uses the optional Gn' interface for directly communicating with a GGSN 157. The Gn' interface allows the GANC 120 to avoid the overhead and latency associated with communicating with the SGSN 155 over the Iu-ps interface of the UTRAN or the Gb interface of the GSM core networks prior to reaching the GGSN 157.

B. Applications of ICS

Figure 2:
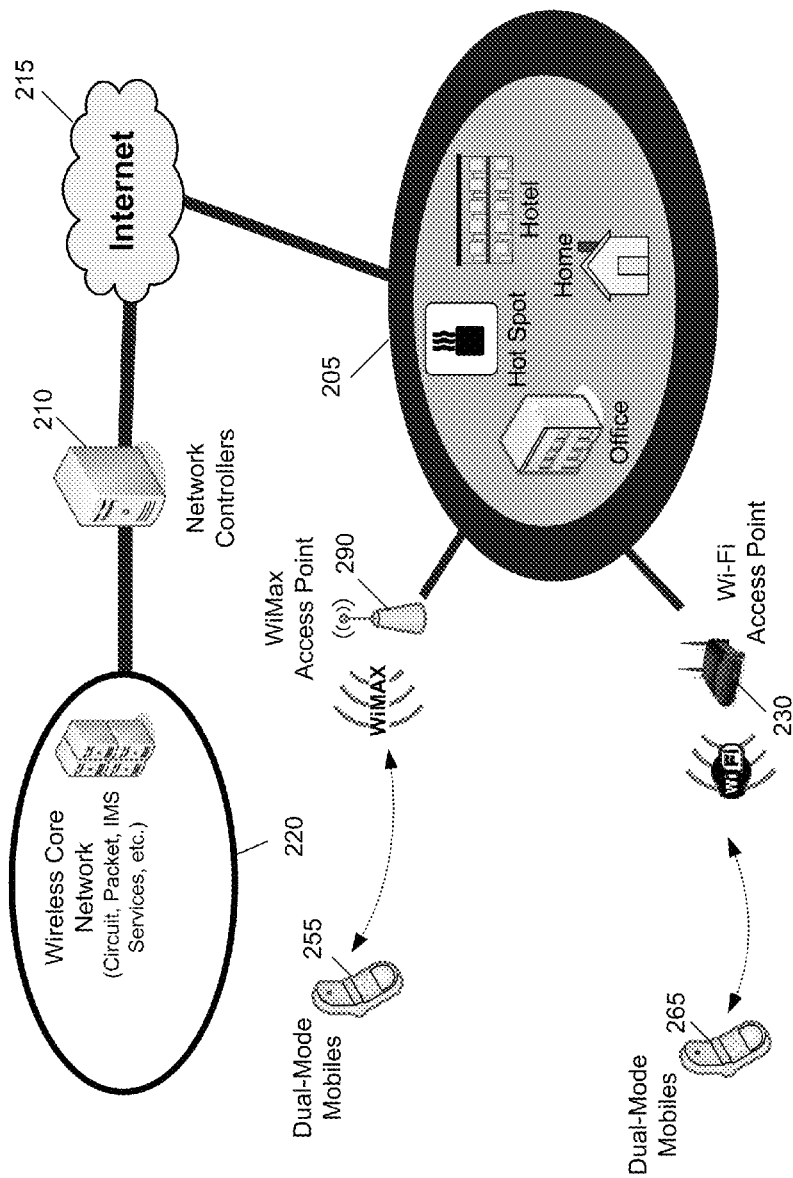
FIG. 2 illustrates several applications of an ICS in some embodiments.

An ICS provides scalable and secure interfaces into the core service network of mobile communication systems. FIG. 2 illustrates several applications of an ICS in some embodiments. As shown, homes, offices, hot spots, hotels, and other public and private places 205 are connected to one or more network controllers 210 (such as the GANC 120 shown in FIG. 1) through the Internet 215. The network controllers in turn connect to the mobile core network 220 (such as the core network 165 shown in FIG. 1).

FIG. 2 also shows several user equipments. These user equipments are just examples of user equipments that can be used for each application. Although in most examples only one of each type of user equipments is shown, one of ordinary skill in the art would realize that other type of user equipments can be used in these examples without deviating from the teachings of the invention. Also, although only of each type of access points, user equipment, or network controllers are shown, many such access points, user equipments, or network controllers may be employed in FIG. 2. For instance, an access point may be connected to several user equipments, a network controller may be connected to several access points, and several network controllers may be connected to the core network. The following sub-sections provide several examples of services that can be provided by an ICS.

1. Wi-Fi

A Wi-Fi access point 230 enables dual-mode cellular/Wi-Fi UEs 265 to receive high-performance, low-cost mobile services when in range of a home, office, or public Wi-Fi network. With dual-mode UEs, subscribers can roam and handover between licensed wireless communication system and Wi-Fi access and receive a consistent set of services as they transition between networks.

2. WiMAX

Some licensed wireless communication system operators are investigating deployment of WiMAX networks in parallel with their existing cellular networks. A dual mode cellular/WiMAX UE 255 enables a subscriber to seamlessly transition between a cellular network and such a WiMAX network through a WiMAX access point 290.

Several examples of Integrated Communication Systems (ICS) are given in the following sub-sections. A person of ordinary skill in the art would realize that the teachings in these examples can be readily combined. For instance, an ICS can be an IP based system and have an A/Gb interface towards the core network while another ICS can have a similar IP based system with an Iu interface towards the core network.

C. Integrated Systems with A/Gb and/or Iu Interfaces Towards the Core Network

FIG. 3 illustrates the A/Gb-mode Generic Access Network (GAN) functional architecture of some embodiments. The GAN includes one or more Generic Access Network Controllers (GANC) 310 and one or more generic IP access networks 315. One or more UEs 305 (one is shown for simplicity) can connect to a GANC 310 through a generic IP access network 315. The GANC 310 has the capability to appear to the core network 325 as a GSM/EDGE Radio Access Network (GERAN) Base Station Controller (BSC). The GANC 310 includes a Security Gateway (SEGW) 320 that terminates secure remote access tunnels from the UE 305, providing mutual authentication, encryption, and data integrity for signaling, voice and data traffic.

The generic IP access network 315 provides connectivity between the UE 305 and the GANC 310. The IP transport connection extends from the GANC 310 to the UE 305. A single interface, the Up interface, is defined between the GANC 310 and the UE 305.

The GAN co-exists with the GERAN and maintains the interconnections with the Core Network (CN) 325 via the standardized interfaces defined for GERAN. These standardized interfaces include the A interface to Mobile Switching Center (MSC) 330 for circuit switched services, Gb interface to Serving GPRS Support Node (SGSN) 335 for packet switched services, Lb interface to Serving Mobile Location Center (SMLC) 350 for supporting location services, and an interface to Cell Broadcast Center (CBC) 355 for supporting cell broadcast services. The transaction control (e.g. Connection Management, CC, and Session Management, SM) and user services are provided by the core network (e.g. MSC/VLR and the SGSN/GGSN).

As shown, the SEGW 320 is connected to an AAA server 340 over the Wm interface. The AAA server 340 is used to authenticate the UE 305 when it sets up a secure tunnel. Some embodiments require only a subset of the Wm functionalities for the GAN application. In these embodiments, as a minimum the GANC-SEGW shall support the Wm authentication procedures.

Figure 4:
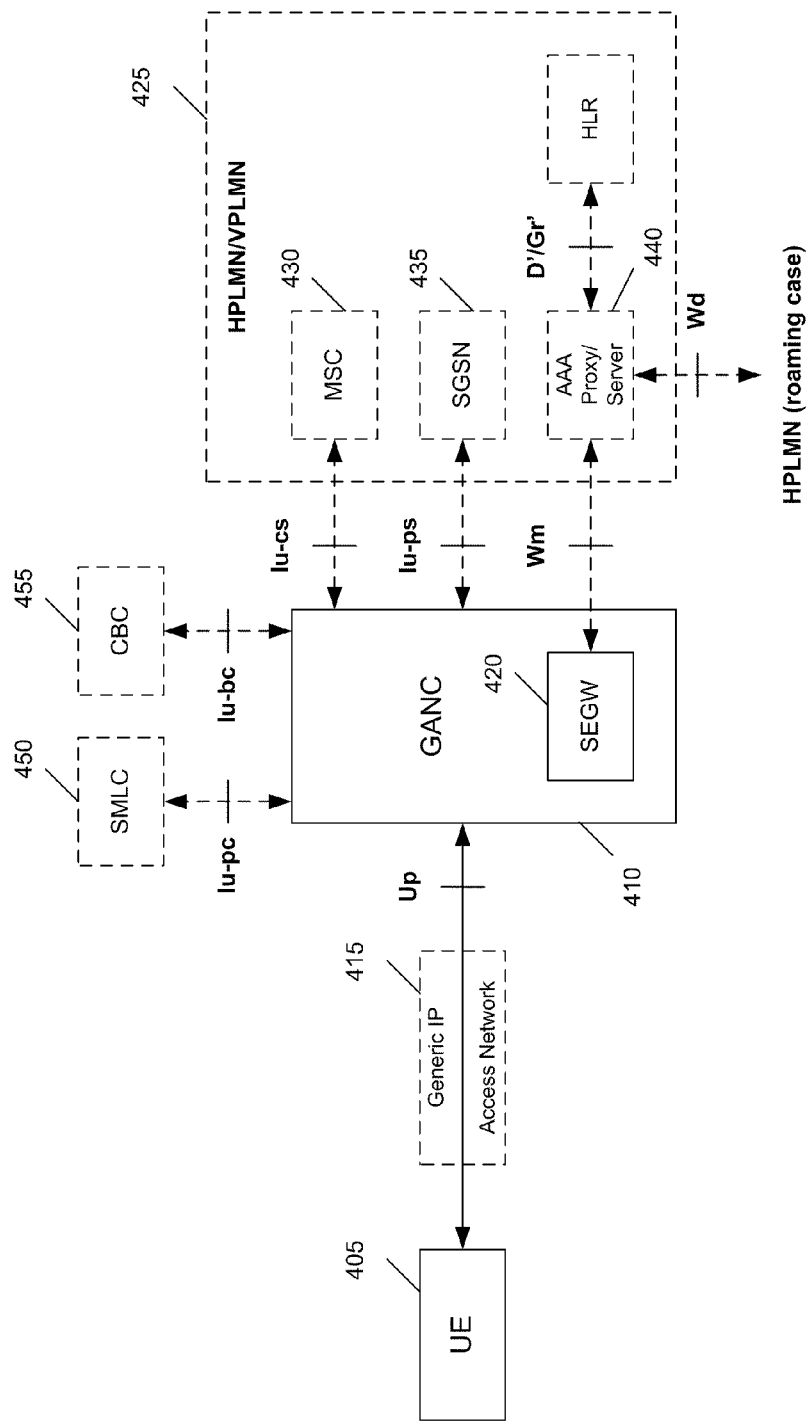
FIG. 4 illustrates the overall Iu-mode GAN functional architecture of some embodiments.

FIG. 4 illustrates the Iu-mode Generic Access Network (GAN) functional architecture of some embodiments. The GAN includes one or more Generic Access Network Controllers (GANC) 410 and one or more generic IP access networks 415. One or more UEs 405 (one is shown for simplicity) can be connected to a GANC 410 through a generic IP access network 415. In comparison with the GANC 310, the GANC 410 has the capability to appear to the core network 425 as a UMTS Terrestrial Radio Access Network (UTRAN) Radio Network Controller (RNC). In some embodiments, the GANC has the expanded capability of supporting both the Iu and A/Gb interfaces to concurrently support both Iu-mode and A/Gb-mode UEs. Similar to the GANC 310, the GANC 410 includes a Security Gateway (SEGW) 420 that terminates secure remote access tunnels from the UE 405, providing mutual authentication, encryption, and data integrity for signaling, voice and data traffic.

The generic IP access network 415 provides connectivity between the UE 405 and the GANC 410. The IP transport connection extends from the GANC 410 to the UE 405. A single interface, the Up interface, is defined between the GANC 410 and the UE 405. Functionality is added to this interface, over the UP interface shown in FIG. 3 to support the Iu-mode GAN service.

The GAN co-exists with the UTRAN and maintains the interconnections with the Core Network (CN) 425 and via the standardized interfaces defined for UTRAN. These standardized interfaces include the Iu-cs interface to Mobile Switching Center (MSC) 430 for circuit switched services, Iu-ps interface to Serving GPRS Support Node (SGSN) 435 for packet switched services, Iu-pc interface to Serving Mobile Location Center (SMLC) 450 for supporting location services, and Iu-bc interface to Cell Broadcast Center (CBC) 455 for supporting cell broadcast services. The transaction control (e.g. Connection Management, CC, and Session Management, SM) and user services are provided by the core network (e.g. MSC/VLR and the SGSN/GGSN).

As shown, the SEGW 420 is connected to a AAA server 440 over the Wm interface. The AAA server 440 is used to authenticate the UE 405 when it sets up a secure tunnel. Some embodiments require only a subset of the Wm functionalities for the Iu mode GAN application. In these embodiments, as a minimum the GANC-SEGW shall support the Wm authentication procedures. Several embodiments for integrating an unlicensed wireless client into an existing Wi-Fi enabled device architecture are disclosed in the following sections. The disclosed unlicensed wireless client supports GAN protocol, UMA protocol, or any similar protocols used to support dual mode user equipments. The disclosed Wi-Fi enabled device provides circuit-switched (CS) and packet-switched (PS) services over the Wi-Fi using one of the supported protocols.

II. Using a Single User Interface in a Dual Mode UE

Figure 5:
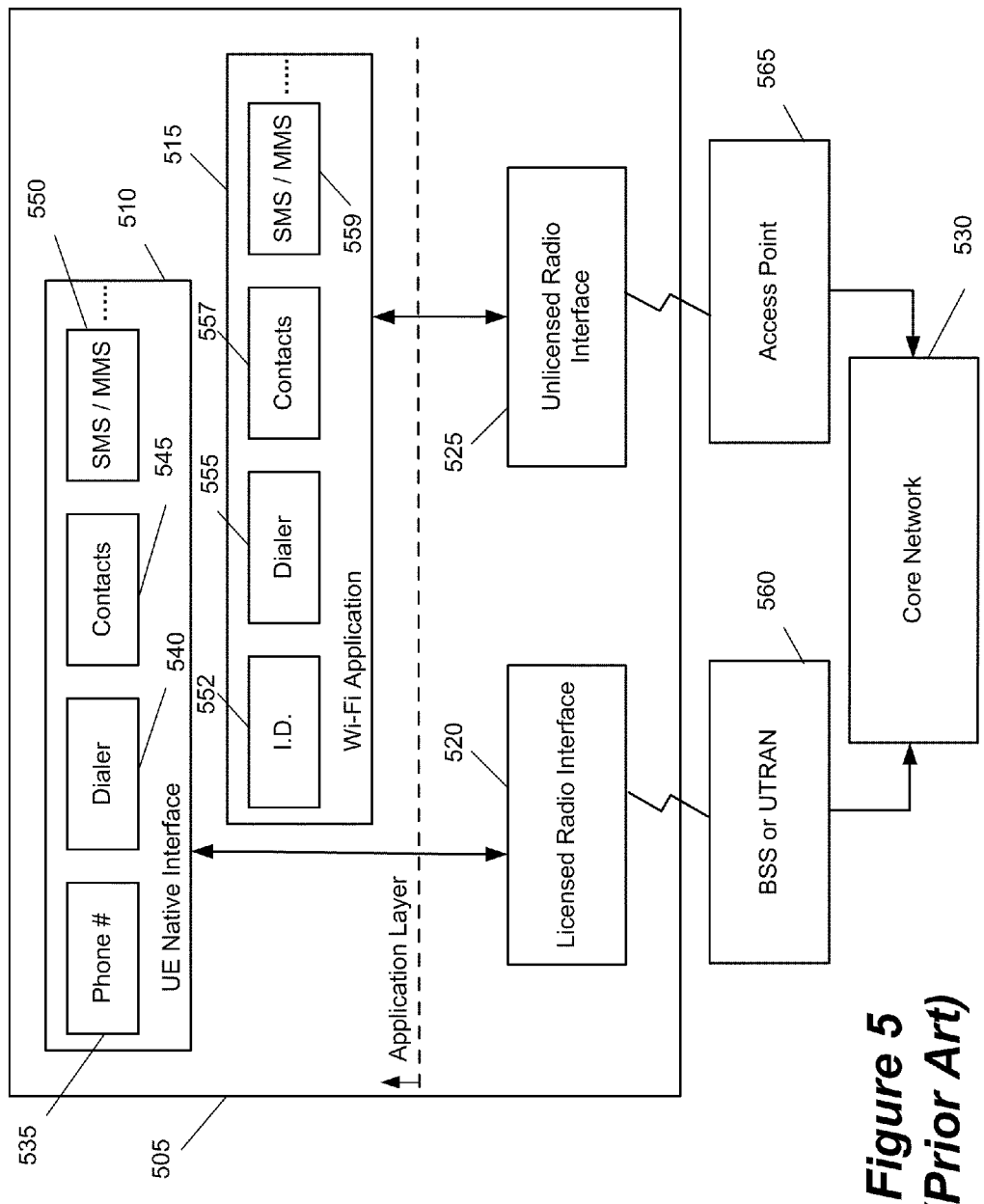
FIG. 5 illustrates an exemplary user equipment (UE) architecture for connecting to a core network through licensed and unlicensed communications channels.
Figure 6:
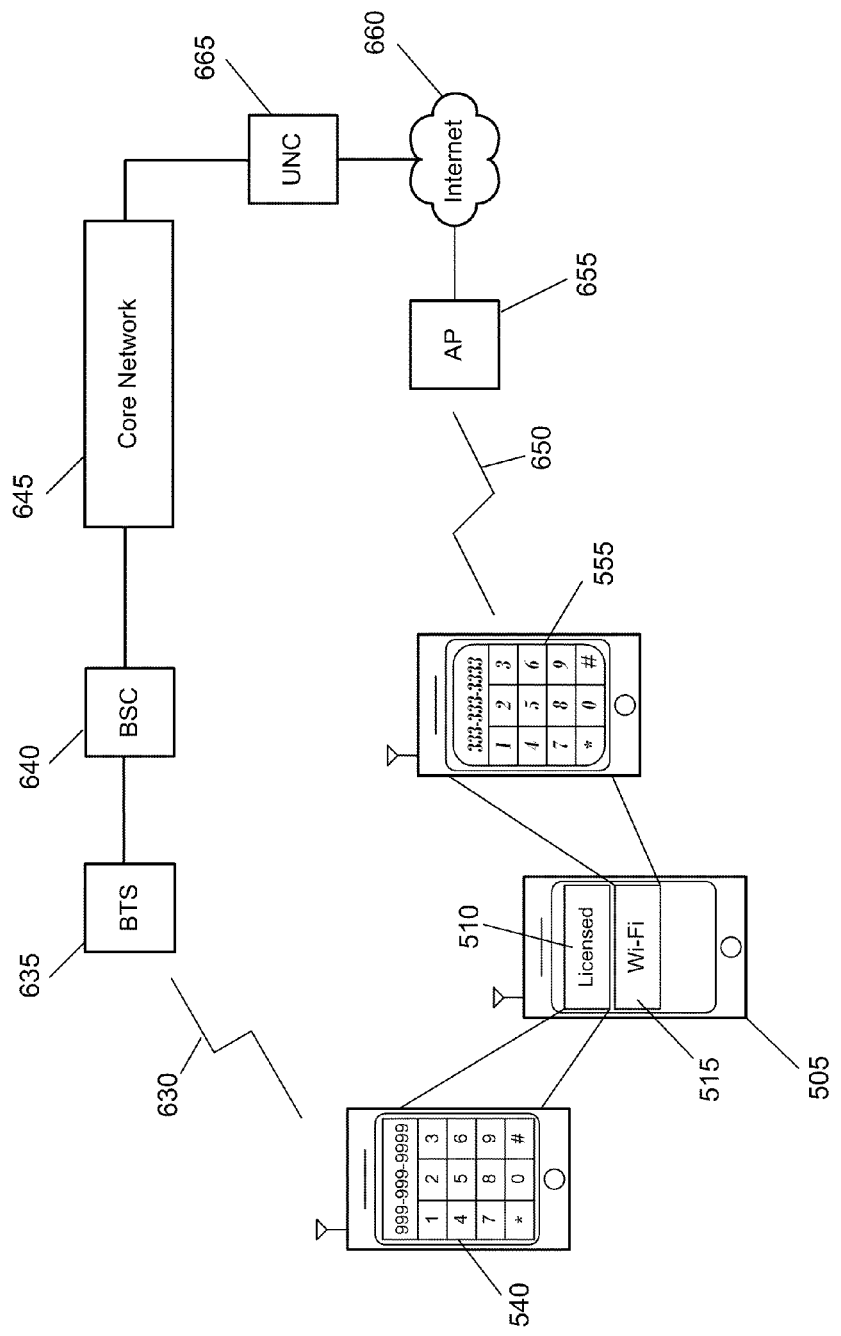
FIG. 6 illustrates separate applications on a UE for connecting to a core network through licensed and unlicensed communications channels.

FIGS. 5-6 illustrate examples of existing prior art implementations for establishing a communications connection with a wireless licensed and unlicensed communications systems using a dual mode UE. FIG. 5 illustrates the different paths a UE 505 utilizes to access services of a mobile core network (CN) 530. As shown in FIG. 5, the UE includes a native interface 510, a Wi-Fi application 515, a licensed radio interface 520, and an unlicensed radio interface 525.

As shown in FIG. 5, UE 505 is a dual mode UE. Licensed radio interface 520 sends and receives voice and data through cellular frequencies. Unlicensed radio interface 525 sends and receives voice and data through unlicensed frequencies. UE 505 includes several applications installed at the application layer that enable UE 505 to access voice and data services from mobile CN 530. Generally, the original equipment manufacturer (OEM) of UE 505 provides native interface 510 to enable the user to access various services from mobile CN 530 via cellular frequencies.

Native interface 510 includes several native applications such as a dialer 540 for inputting telephone numbers, a contacts list 545 for storing contacts, and applications for enabling short message 550 and multimedia message services. Each of the applications in native interface 510 utilizes a single unique identity or phone number 535 to identify the UE 505. Native interface 510 sends commands received from the native applications to licensed radio interface 520, which interprets the commands and facilitates communications between UE 505 and a base station subsystem (BSS) or a UMTS terrestrial radio access network (UTRAN) 560 using licensed wireless frequencies. BSS or UTRAN 560 is responsible for channel allocation, transcoding, paging, transmitting and receiving of data between UE 505 and CN 530.

UE 505 can also access services from CN 530 through an alternative route when a broadband connection is available. To accomplish this, UE 505 is loaded with a separate Wi-Fi application 515 made available by a third party. This Wi-Fi application 515 utilizes the Wi-Fi radio of UE 505 to establish a connection to CN 530 through a broadband connection provided by access point 565. In a conventional system, Wi-Fi application 515 assigns the UE with a separate identity 552 and separate applications (e.g., a dialer application 555, contact lists 557, SMS/MMS application 559, etc.) in order to provide unlicensed wireless services.

Furthermore, Wi-Fi application 515 utilizes a different set of commands for requesting CN services through the broadband connection. These commands are sent from the Wi-Fi application 515 to an unlicensed radio interface 525 which interprets the commands and establishes a communication session with the mobile CN 530 using the Wi-Fi radio of UE 505. The drawback of this implementation is that a user must access different applications on UE 505 when requesting mobile CN services through either a cellular network or a broadband network. Furthermore, a user must establish a secondary identity, such as a secondary phone number or user name, when accessing CN services through a broadband connection.

FIG. 6 illustrates the path that UE 505 follows to access a mobile CN 645 when using either the native application or the Wi-Fi application on UE 505. UE 505 uses cellular application 510 for access CN 645 through licensed cellular frequencies 630 and Wi-Fi application 515 to access CN 645 through unlicensed wireless frequencies 650 and broadband (e.g., the Internet 660). Communications over licensed cellular frequencies 630 pass through a base transceiver station (BTS) 635 and a base station controller (BCS) in order to connect to CN 645. Alternatively, a Node B 180 and an RNC 175 of a UTRAN 185 can be used to communicatively couple the UE to the core network.

For unlicensed access, an access point (AP) 655 facilitates communication between UE 505 and CN 645 using both unlicensed wireless frequencies 650 and broadband connection. AP 655 communicates with an unlicensed mobile access (UMA) network controller UNC 665 via the Internet through the broadband Internet connection. Alternatively, a GANC 120 can be used as the network controller. AP 655 communicates with UE 505 via unlicensed wireless frequencies 650.

As illustrated in FIG. 6, when a user places a call through the user's mobile service provider, the user accesses the native cellular application 510 on the user interface of UE 505. Such applications can include dialers, contact lists, and SMS/MMS applications. Dialer application 540 enables the user to dial and connect to CN 645 using licensed wireless frequencies. Typically, both of the cellular application 510 and the dialer application 540 are included along with UE 505 by the UE OEM. As shown in FIG. 5, native dialer 540 sends commands to the licensed radio interface 520 that facilitates communication with CN 530 through the BSS or UTRAN 560 using a cellular radio of the UE 505.

Figure 7:
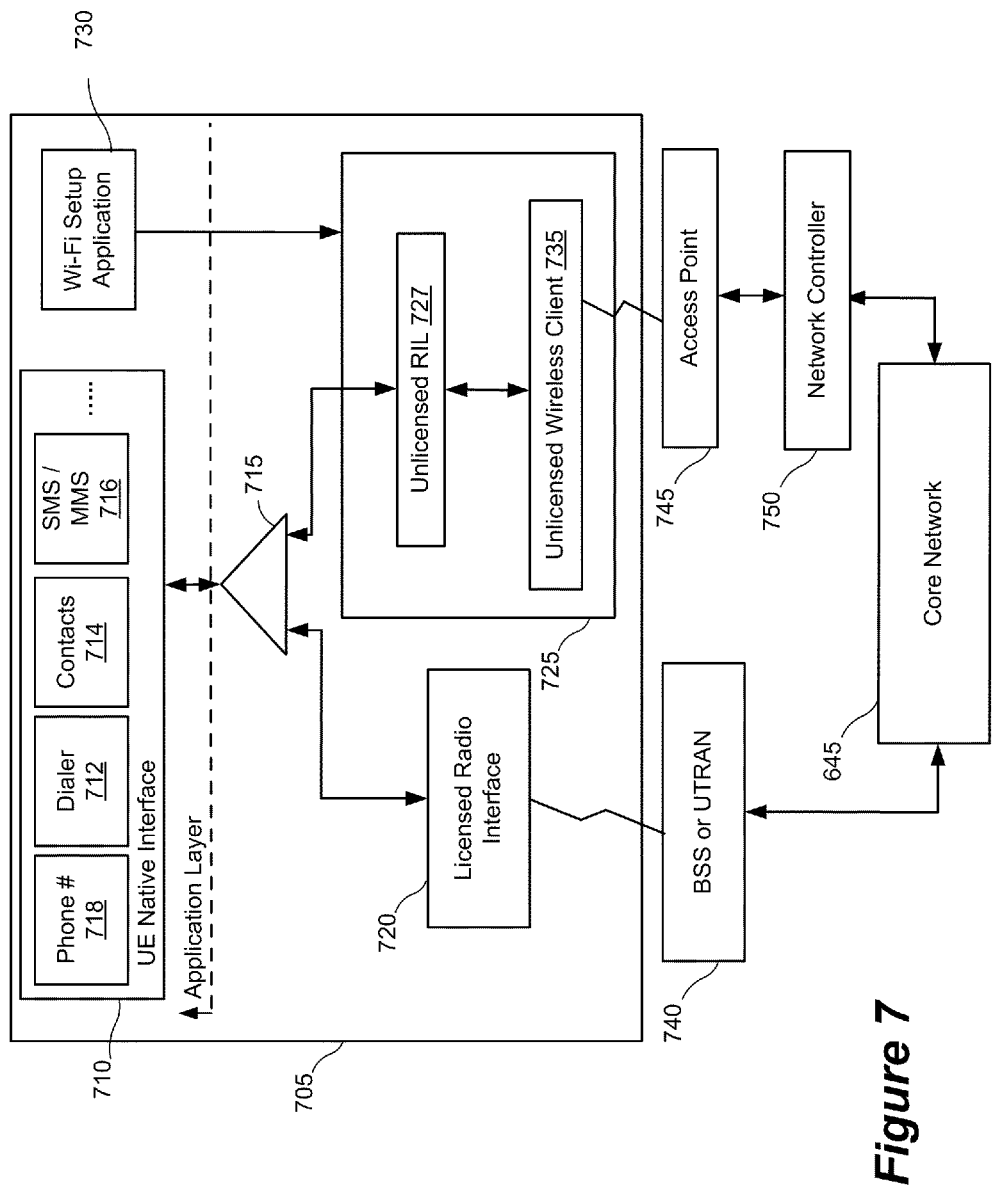
FIG. 7 illustrates a UE architecture that includes a logical switch for redirecting commands from native applications to an unlicensed radio interface layer according to some embodiments of the present invention.
Figure 8:
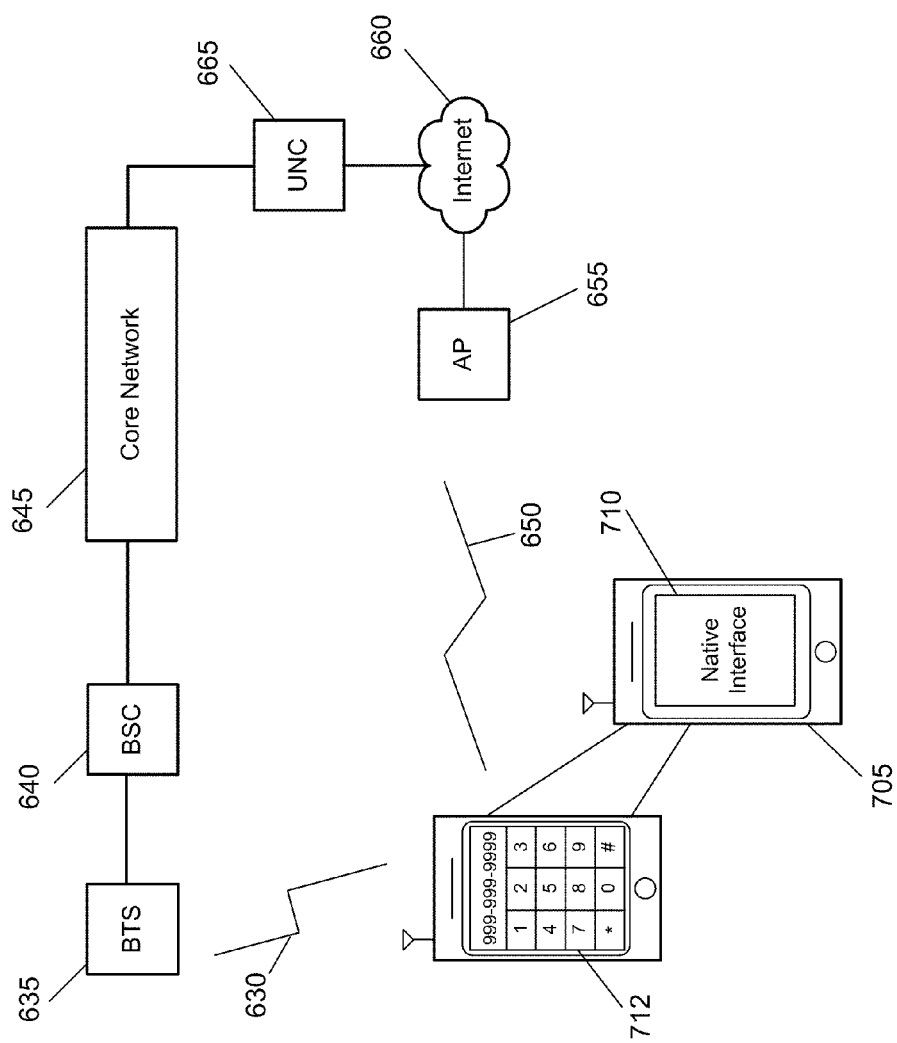
FIG. 8 illustrates a UE that uses a single native application for connecting to either a licensed or unlicensed wireless communication network
Figure 9:
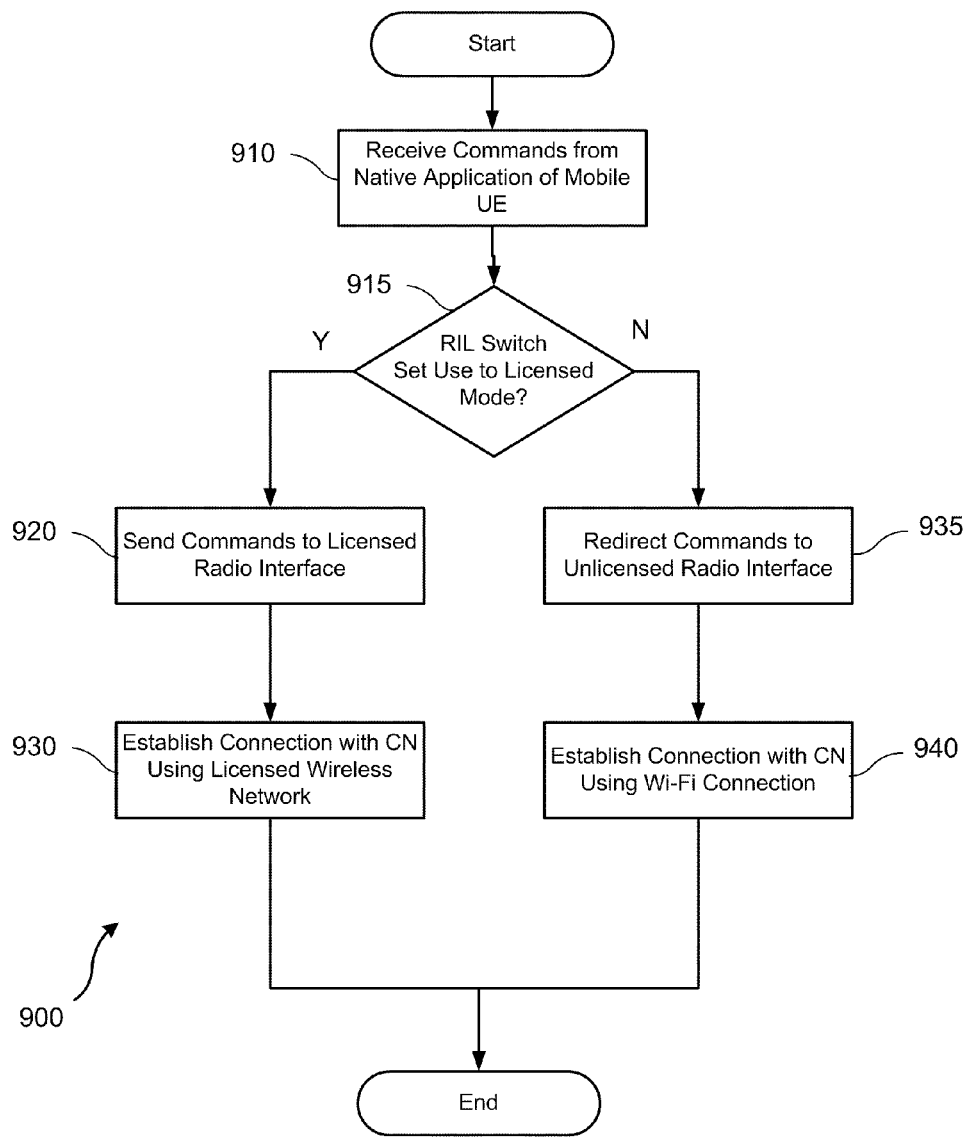
FIG. 9 illustrates a process for connecting a UE to either a licensed or unlicensed wireless communication network according to some embodiments of the present invention.

On the other hand, when a user places a call or requests data through a broadband connection, the user accesses a separate Wi-Fi application 515 that has a second dialer application 555. This particular dialer is only accessible through Wi-Fi application 515, which is provided by a third party. Referring to FIG. 5, commands from the Wi-Fi dialer 555 are sent to the unlicensed radio interface 525. The unlicensed radio interface 525 facilitates communication with CN 530 through the AP 565 which connects the UE to the broadband. Referring back to FIG. 6, UNC 665 receives the request for services from the UE 505 and opens a communication channel between CN 645 and the UE 505 through the unlicensed wireless frequencies 650 provided by the AP 655. FIGS. 7-9 illustrate exemplary systems and methods for communicating with a mobile core network via either a licensed radio interface or an unlicensed radio interface using a single UE identifier and/or a single user interface according to some embodiments of the present invention.

A. Using a Single User Interface for Both Licensed and Unlicensed Services

FIG. 7 illustrates the CS (i.e., voice and message) interface for a UE 705 that uses a single UE identifier and a single interface to communicate with CN 645 via either licensed radio interface 720 or unlicensed radio interface 725 according to some embodiments of the present invention. As shown in FIG. 7, the UE 705 includes a mobile native interface (or application) 710, a Wi-Fi setup application 730, a radio interface layer (RIL) switch 715 (also referred to as a path switch), a licensed radio interface 720, and an unlicensed radio interface 725. Native interface 710 includes several native applications such as a dialer 712 for inputting telephone numbers, a contacts list 714 for storing contacts, and applications 716 for enabling short message and multimedia message services. Each of the applications in native interface 710 utilizes a single unique identity or phone number 718 to identify the UE 705.

In some embodiments, native interface 710 is identical to native interface 510 as described in FIG. 5. Wi-Fi setup application 730 is an application layer interface that enables UE 705 to access the functionalities of unlicensed radio interface 725, which communicates with access point 745 to establish communication with CN 645 through a network controller 750. For licensed wireless communication, UE 705 communicates with CN 645 via BSS or UTRAN 740, which communicates with UE 705 via licensed radio interface 720.

In some embodiments, RIL switch 715 is a logical switch which is used to redirect commands received from mobile native interface 710 to unlicensed radio interface 725 (which repackages the commands for packet services over Wi-Fi and forwards them to access point 745) when UE 705 is in unlicensed mode. UE 705 may enter unlicensed mode automatically upon the detection of (and authenticating with) a nearby access point. Alternatively, UE 705 may enter unlicensed mode only upon request of the user and when broadband access is available. In this manner, RIL switch 715 eliminates the need for a separate Wi-Fi application such as application 515 of FIG. 5 that uses a separate and distinct UE identity to communicate with CN 645 via an unlicensed wireless frequency access point.

In some embodiments, unlicensed radio interface 725 includes an unlicensed radio interface layer (RIL) 727 and an unlicensed wireless client 735. Each of these components of unlicensed radio interface 725 will be described in greater detail below.

In order to implement this architecture on UE 705, unlicensed radio interface 725 receives commands (e.g., in response to user input) from mobile native interface 710 through the RIL switch 715. The unlicensed radio interface 715 then reformats the commands to enable UE 705 to use unlicensed wireless protocols to access CN 645. Similarly, when the UE is operating in unlicensed mode and for instance a text message is received from the core network, the text message is received at the unlicensed radio interface 725 through the network controller 750 and the access point 745. The unlicensed radio interface 715 sends the text message through the RIL switch 715 to SMS/MMI application 716 which will then present it to the user. When the UE is operating in licensed mode and for instance a text message is received from the core network, the text message is received at the licensed radio interface 720 through the BSS or UTRAN 740. The licensed radio interface 720 sends the text message through the RIL switch 715 to SMS/MMI application 716 which will then present it to the user.

FIG. 8 shows UE 705 communicating with mobile core network 645 via either licensed wireless frequency 630 or unlicensed wireless frequencies 650 using a single native dialer 712 according to some embodiments of the present invention. Referring to FIG. 7, Wi-Fi setup application 730 and RIL switch 715 enable UE 705 to use native application 710 provided by the OEM of UE 705 to access CN 645 via the licensed wireless or the unlicensed wireless path. As shown in FIG. 8, a single native application 710 provides a user with a native dialer interface 712. From native dialer interface 712, a user can make a call in the same manner as the user would to make a cellular call. As discussed below by reference to FIG. 9, when unlicensed wireless connection 650 is available to connect with broadband (Internet) services, the call can automatically be routed through the broadband services and the network controller 665 in order to open a communication channel between CN 645 and the UE 705.

B. Selecting Between Licensed and Unlicensed Services

Figure 10:
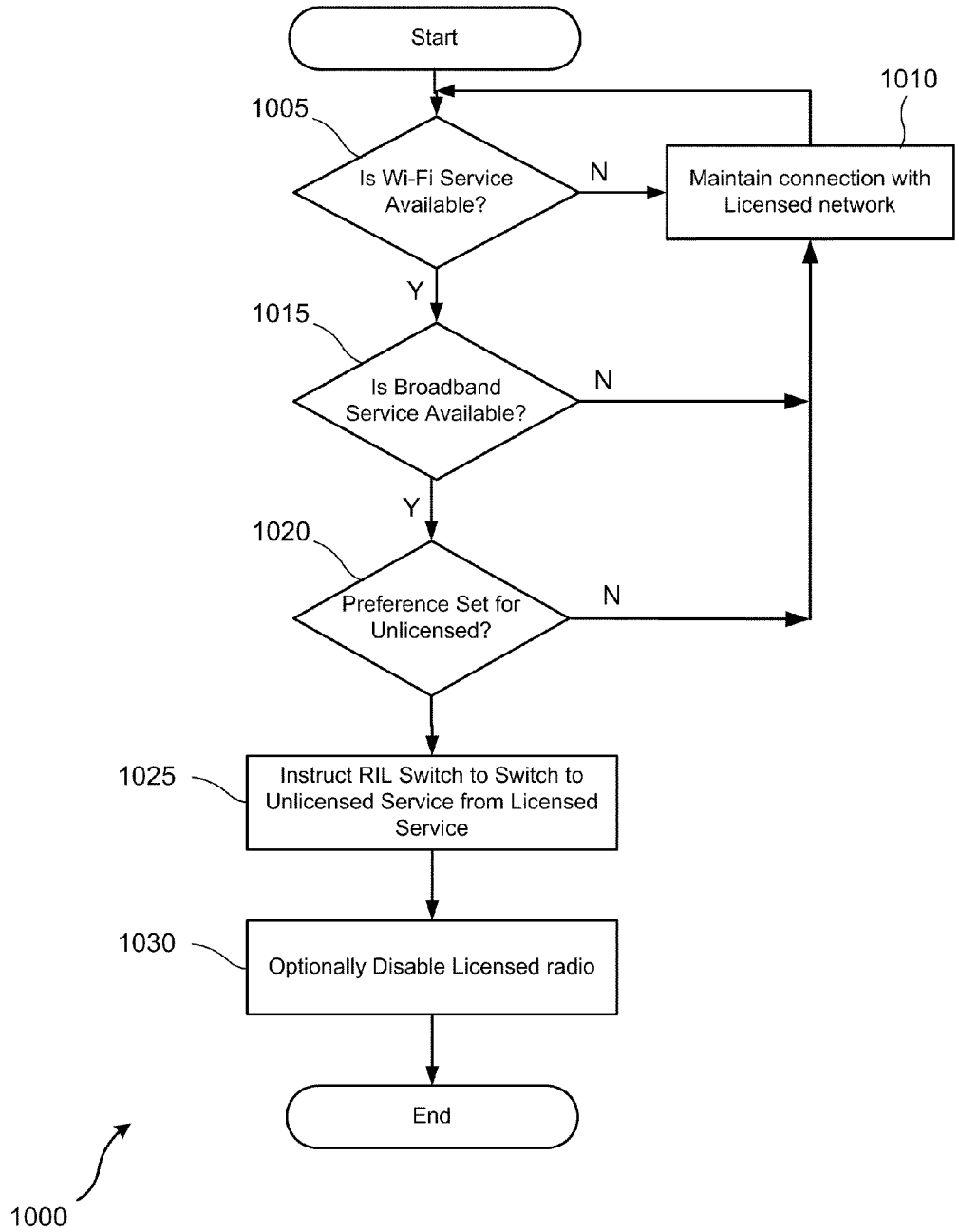
FIG. 10 illustrates a process for determining whether the licensed radio interface or the unlicensed radio interface shall be used to communicate with the core network in some embodiments.

FIG. 10 conceptually illustrates a process 1000 of some embodiments that determines whether to use the licensed or the unlicensed radio interface of a dual mode UE to access the services of the CN. Process 1000 will be described with reference to FIGS. 11 and 12 which show a UE in different licensed and unlicensed service regions. As shown, process 1000 determines (at 1005) whether Wi-Fi service is available. In some embodiments, a Wi-Fi module (part of a WLAN subsystem) of the dual mode UE automatically scans for Wi-Fi devices and associate with any found Wi-Fi devices (e.g., Wi-Fi access points). Once such a Wi-Fi-device is found, the Wi-Fi module of the UE sends an indication to process 1000 that Wi-Fi service is available. When the process determines that Wi-Fi service is not available, the process maintains (at 1010) the connection with the licensed network through the licensed radio interface 720. The process proceeds to 1005 to continue waiting for the availability of the Wi-Fi service.

When the Wi-Fi service is available, the process determines (at 1015) whether broadband (e.g. the Internet is also available). Availability of the Internet avoids a captive portal situation in which Wi-Fi is available by an access point which is not connected to broadband and therefore is not able to connect the UE to the CN. When the broadband service is not available, the process proceeds to 1010 that was described above. In some embodiments, the Wi-Fi module of the UE also determines whether the detected Wi-Fi device is connected to the broadband and sends an indication to process 1000 about the availability of the broadband connection. In some embodiments, process 1000 receives (at 1015) this indication separately. In other embodiments, the availability of Wi-Fi and the broadband are received in one indication (at 1005). In these embodiments, operations 1005 and 1015 are merged.

Figure 11:
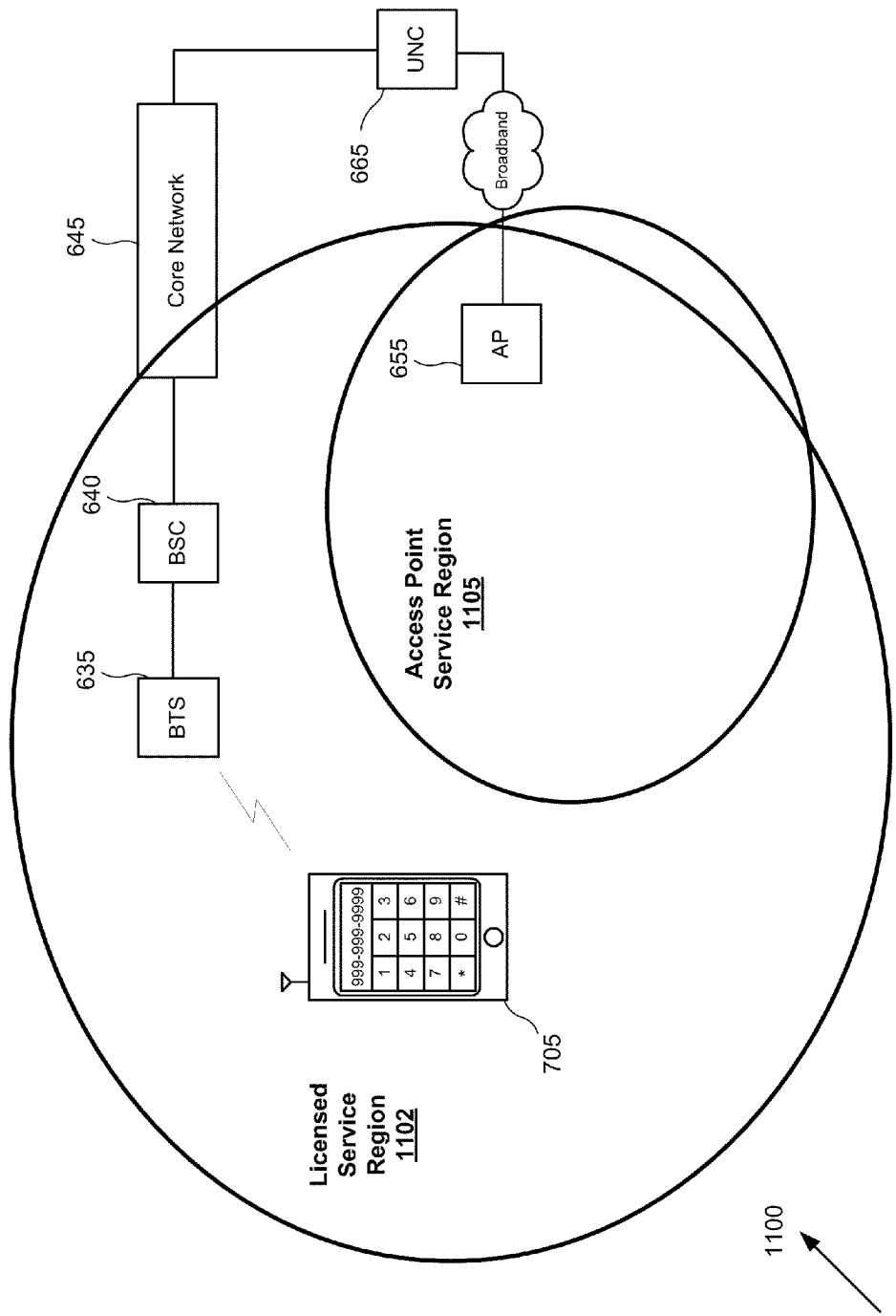
FIGS. 11-12 illustrate an example environment with which the UE can be implemented according to some embodiments of the present invention.

FIG. 11 conceptually illustrates a communication system 1100 that includes a licensed service region 1102 and an unlicensed service region 1105 associated with an AP 655. Other components of the system are similar to components described by reference to FIG. 8. Although the licensed and unlicensed service regions are shown to have overlap, it is also possible that the AP 655 is outside a cellular service region or in an area where no cellular service is available (e.g., indoors). In the example of FIG. 11, the UE 705 is within the licensed service region 1102 but outside of the unlicensed service region 1105. Accordingly, process 1000 determines that Wi-Fi services are not available. Accordingly, when establishing a connection with the CN 645, UE 705 will communicate with BTS 635 which will connect UE 705 to the CN 645 through BSC 640.

Figure 12:
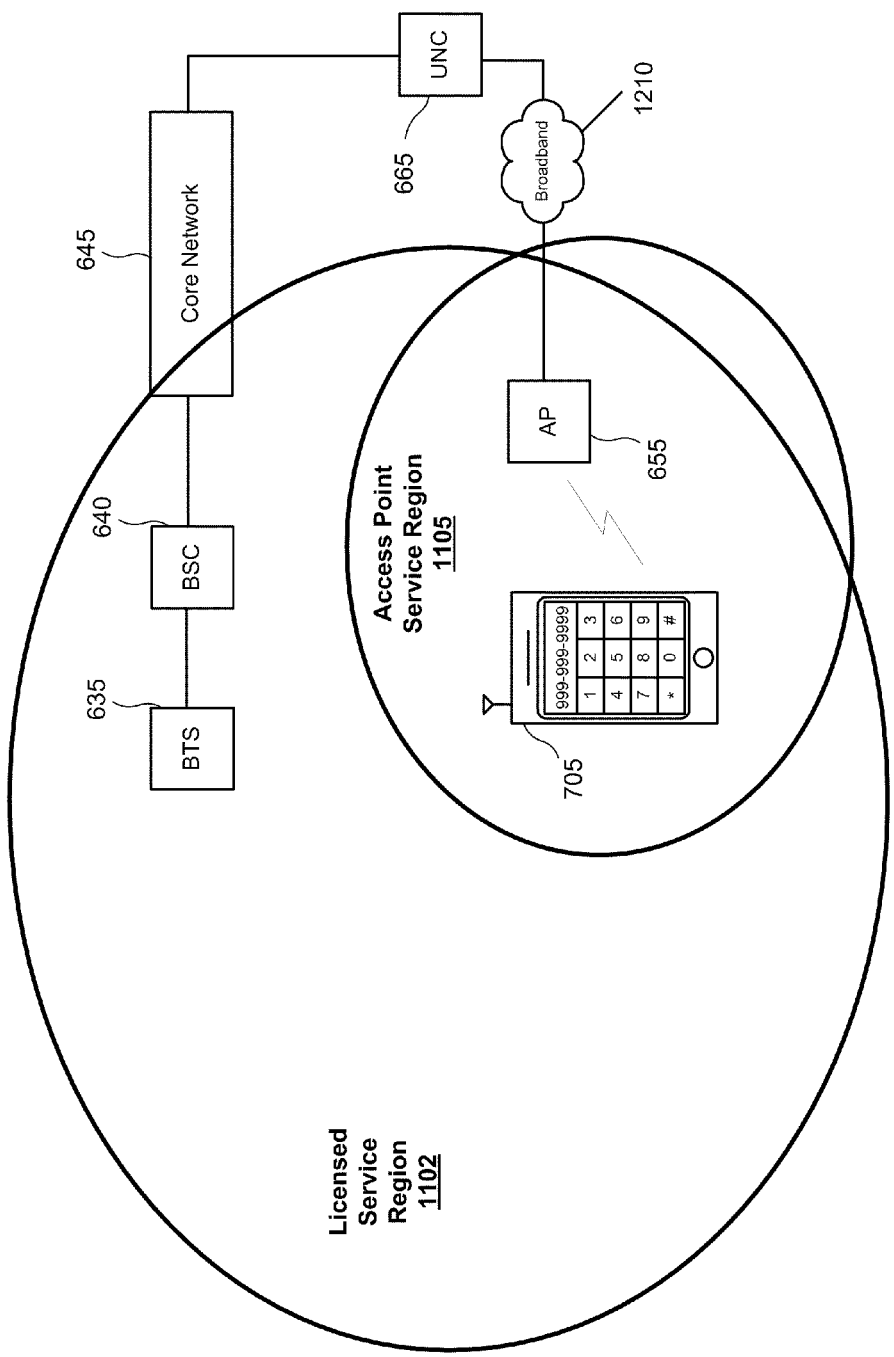

FIG. 12 conceptually illustrates UE 705 within the access point service region 1105. Accordingly, process 1000 receives an indication from the Wi-Fi module of the UE that Wi-Fi services are available. Furthermore, as shown, AP 655 is also connected to broadband 1210. Accordingly, process 1000 receives an indication (as the same or as a separate indication) from the Wi-Fi module of the UE that broadband services are also available through the AP 655. In some embodiments, the UE includes a Wi-Fi management application that accesses the stored credentials of all known Wi-Fi access points that the UE is authorized to use. When the UE comes in range of an access point, the Wi-Fi management application checks to determine whether the access point is among the access points whose credentials are stored in the UE. In some embodiments, when the UE comes in range of a Wi-Fi system such as a hot spot, the user is prompted that an open hot spot is available and is asked whether the user wishes to connect to the open Wi-Fi. For some hot spots, the user has to either enter a user name and password or has to enter a credit card number (e.g., by opening a browser and entering the card number).

In some embodiments, process 1000 receives an indication from the Wi-Fi management application that a Wi-Fi system is available. Once the process determines that both Wi-Fi and broadband services are available through the detected Wi-Fi device, process 1000 determines (at 1020) whether the licensed or the unlicensed radios shall be used. In some embodiments, the user of the UE determines the preference for using the licensed versus unlicensed services. In other embodiments, the preferences are pre-set by the OEM of the UE. In some embodiments, the user can either use the preferences pre-set of the OEM as default or change them through the UE user interface. Yet in some embodiments, the process automatically connects to Wi-Fi upon the availability (and successful registration). In these embodiments, operation 1020 is skipped.

When process 1000 determines that preferences are not set to use unlicensed service, the process proceeds to 1010 which was described above. Otherwise, the process instructs (at 1025) the RIL switch 715 to direct user commands to unlicensed radio interface. In some embodiments, process 1000 activates the RIL switch 715 only after a successful registration with the Wi-Fi system. Next, the process optionally disables (at 1030) the licensed radio or places the licensed radio in low power state, e.g., with enough power to allow access to the (U)SIM card. The process then ends. Referring back to FIG. 12, once it is determined that the UE shall use the services of the CN through the unlicensed radio interface, the UE is communicatively coupled to the CN 645 through the AP 655, broadband 1210, and the network controller 665.

One of ordinary skill in the art will recognize that process 1000 is a conceptual representation of a process that determines whether to use the licensed or the unlicensed radio interface of a dual mode UE. The specific operations of the process may not be performed in the exact order described or different specific operations may be performed in different embodiments. Also, the process may not be performed as one continuous series of operations. Furthermore, the process could be implemented using several sub-processes, or as part of larger macro-process.

Once availability of the Wi-Fi and broadband services as well as the preferences are determined, the commands a user enters through the user interface are directed from the RIL switch to either the licensed radio interface of the unlicensed radio interface. FIG. 9 conceptually illustrates a process 900 of some embodiments that handles the user commands for a dual mode UE in some embodiments. This process is utilized when, for instance, the user places a call using the native dialer 710 of the UE.

As shown, process 900 receives (at 910) commands from native applications of UE 705 (e.g., for placing a call). Process 900 then determines (at 915) whether the RIL switch is set to direct traffic to the licensed radio interface. As described by reference to FIG. 10, process 1000 determines whether the UE shall use the licensed or unlicensed radios depending on the availability of Wi-Fi, availability of the Internet, and preferences, the UE uses either of the licensed or unlicensed radios. When the UE shall use the licensed radio, process 900 proceeds to 920 which is described below. Otherwise, the process sends (at 935) commands from the native applications of UE 705 to the unlicensed radio interface. Next, the process enables UE to establish or to maintain (at 940) a communication channel with the CN using the unlicensed frequencies and the broadband services. The process then ends.

When the process determines that the UE shall use the licensed services, the process sends (at 920) the commands received from the native applications to licensed radio interface 720 as it normally would when requesting CN services using licensed cellular frequencies. Next, the process enables the UE to establish or maintain (at 930) a communication channel with CN 645 (if the connection is not already established) using the licensed wireless network. The process then ends.

One of ordinary skill in the art will recognize that process 900 is a conceptual representation of the operations used to establish communication with a core network via either unlicensed or licensed wireless frequencies. The specific operations of process 900 may not be performed in the exact order described or different specific operations may be performed in different embodiments. Also, process 900 may not be performed as one continuous series of operations. Furthermore, process 900 could be implemented using several sub-processes, or as part of larger macro-process.

The above discussion has illustrated how native application commands can be redirected to an unlicensed radio interface to eliminate the need for different applications to connect to a core network. However, a solution is also needed to alleviate the need for two different subscriber identities when accessing core network services using licensed and unlicensed communications networks. The next section will discuss how a UE can re-use the subscriber identity assigned by the cellular network provider when communicating with CN 635 through both wireless licensed and unlicensed communications networks.

III. Using a Single Identity to Access Licensed and Unlicensed Services

In some embodiments the UE includes a subscriber identity module (SIM) or a universal subscriber identity module USIM on a removable SIM card. The term (U)SIM is used hereinafter to refer to either a SIM module or a USIM module. The (U)SIM module includes several elementary files (EFs) such as EFimsi, EFacc, EFloci, EFepsloci, EFkeys, EFsms, EFsmsp, EFsmss, and EFsmsr. The information stored in the EFs include identify of a subscriber on the UE (e.g., international mobile subscriber identity, IMSI, of the subscriber). Other information include the unique serial number, security authentication and ciphering information, temporary information related to the local network, a list of the services the user has access to and one or more passwords.

Figure 13:
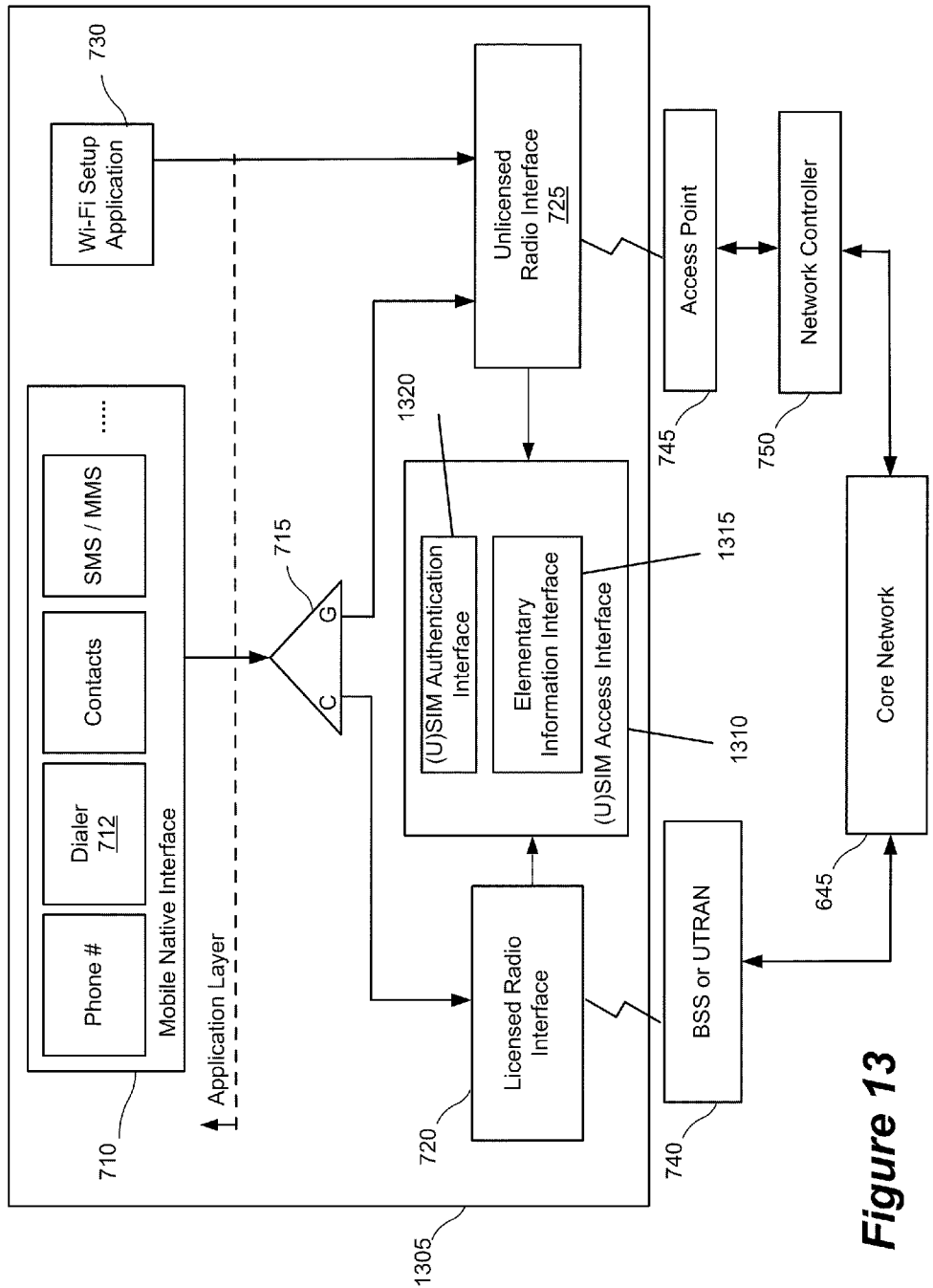
FIG. 13 illustrates a high level architecture of the UE according to some embodiments of the present invention.

FIG. 13 conceptually illustrates a UE 1305 according to some embodiments of the present invention. As shown, the UE includes a (U)SIM access interface 1310. Other entities in FIG. 13 are similar to entities described by reference with FIG. 7. Native applications access the SIM card via SIM access interface 1310. As shown, the (U)SIM interface includes an elementary information interface 1315 and a (U)SIM authentication interface 1320.

The elementary information interface 1315 is used by both licensed radio interface 720 and unlicensed radio interface 725 to access elementary files (EFs) on the (U)SIM. The information in the EFs is used, e.g., in GAN registration procedures, Non Access Stratum (NAS) circuit switched (CS) and packet switched (PS) registration procedures, and SMS handling.

The U)SIM access interface 1310 also includes a (U)SIM authentication interface which is used for GSM authentication, EAP-SIM authentication, and location area updates. The (U)SIM access interface also generates integrity and ciphering keys and provides them to the unlicensed radio interface 725 upon request for use in generic access (GAN) and NAS security mode procedures. As described below, when the UE accesses the CN through the unlicensed radio interface 725, the licensed radio can either be turned off or placed in a low power mode and the licensed protocol stack can be detached. The (U)SIM access interface 1310, however, remains available to the unlicensed radio interface 725 after the licensed protocol stack is detached. In some embodiments, the unlicensed radio interface 725 accesses the (U)SIM access interface through an application programming interface (API). In some embodiments, the API to elementary information interface 1315 is available through the operating system running on the UE while the API to (U)SIM authentication interface is provided by an original equipment manufacturer (OEM) of the UE.

In some embodiments, the (U)SIM card credentials (which is used for authentication to access licensed services) is reused by the unlicensed radio interface 725 in the process of unlicensed authentication to establish the IPSec tunnel and access unlicensed services. The reuse of the (U)SIM card credentials eliminates the need for the user of the UE to enter a user name and password for the authentication of the UE. In addition, the licensed network periodically sends an authentication challenge to the UE regardless of whether the UE is in licensed or unlicensed mode. This authentication challenge could include a set of numbers (e.g., three numbers referred to as a triplet). The triplet is given to the (U)SIM card which uses its private key and its algorithm to modify the triplet to generate a signed triplet. The signed triplet is sent to the licensed network (when the UE is either in the licensed or unlicensed mode). The licensed network has its own copy of the algorithm and the private key. The licensed network generates a copy of the signed triplet and compares it with the signed triplet received from the UE. When the two set of values match, the UE successfully passes the challenge.

Figure 14:
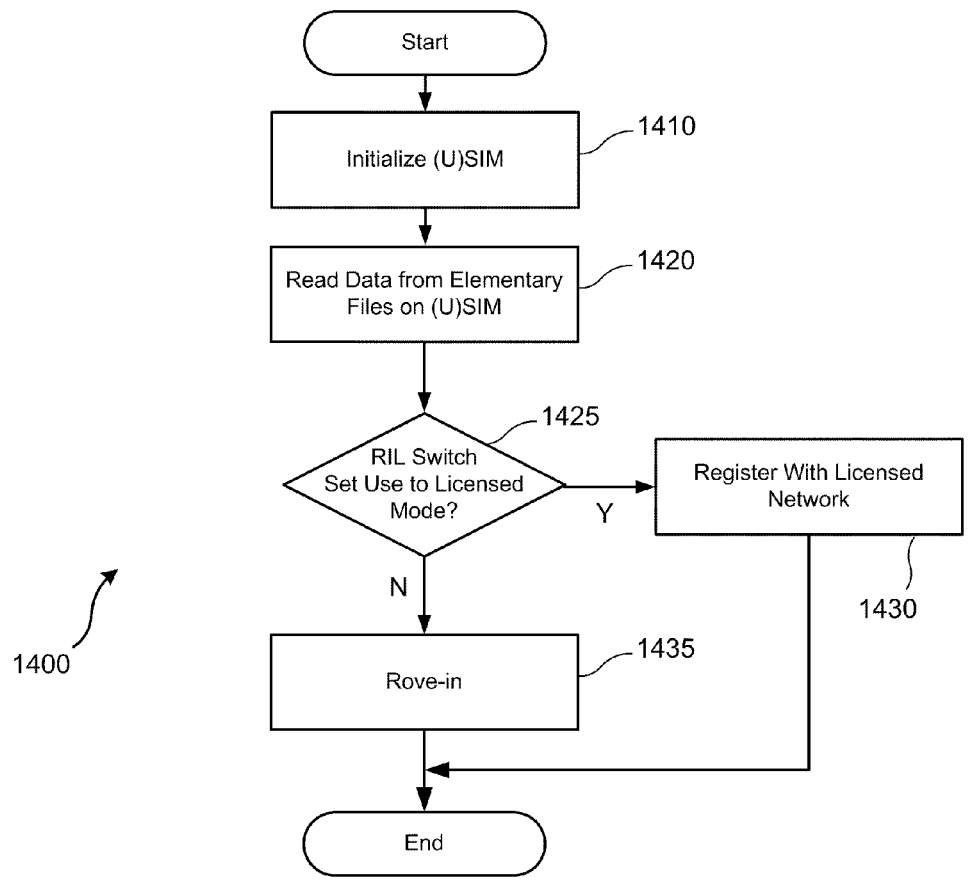
FIG. 14 illustrates an initialization process of a UE according to some embodiments of the present invention.

FIG. 14 illustrates a conceptual power up process 1400 of a dual mode UE according to some embodiments of the present invention. As shown, process 1400 optionally initializes (at 1410) the (U)SIM card installed in UE 705. After the initialization procedure, process 1400 reads (at 1420) data from elementary files (EF) on the (U)SIM. In some embodiments, process 1400 reads the EFs including EFimsi, EFacc, EFloci, EFepsloci, EFkeys, EFsms, EFsmsp, etc. One or more of these EF data are forwarded to unlicensed wireless client 735 of unlicensed radio interface 725 for use in unlicensed registration procedures, non access stratum (NAS) circuit-switched (CS) and packet-switched (PS) registration procedures, and SMS handling.

Process 1400 then determines (at 1425) whether unlicensed wireless services shall be used. In some embodiments, process 1000 (described above) determines whether the licensed or unlicensed services are to be used and sets the RIL switch to direct traffic flow to either the licensed radio interface or the unlicensed radio interface. When the licensed wireless services are to be used, process 1400 instructs (at 1430) UE 705 to register itself with the cellular or licensed network via BSS/UTRAN 740. On the other hand, when the unlicensed wireless services are to be used, process 1400 starts (at 1435) the rove-in and unlicensed registration procedure. The rove-in and the unlicensed registration will be discussed in greater detail below. The process then ends.

One of ordinary skill in the art will recognize that process 1400 is a conceptual representation of the SIM initialization process. The specific operations of the process may not be performed in the exact order described or different specific operations may be performed in different embodiments. Also, the process may not be performed as one continuous series of operations. Furthermore, the process could be implemented using several sub-processes, or as part of larger macro-process.

IV. Integrated Wi-Fi Implementation

A. Rove-In

Figure 15:
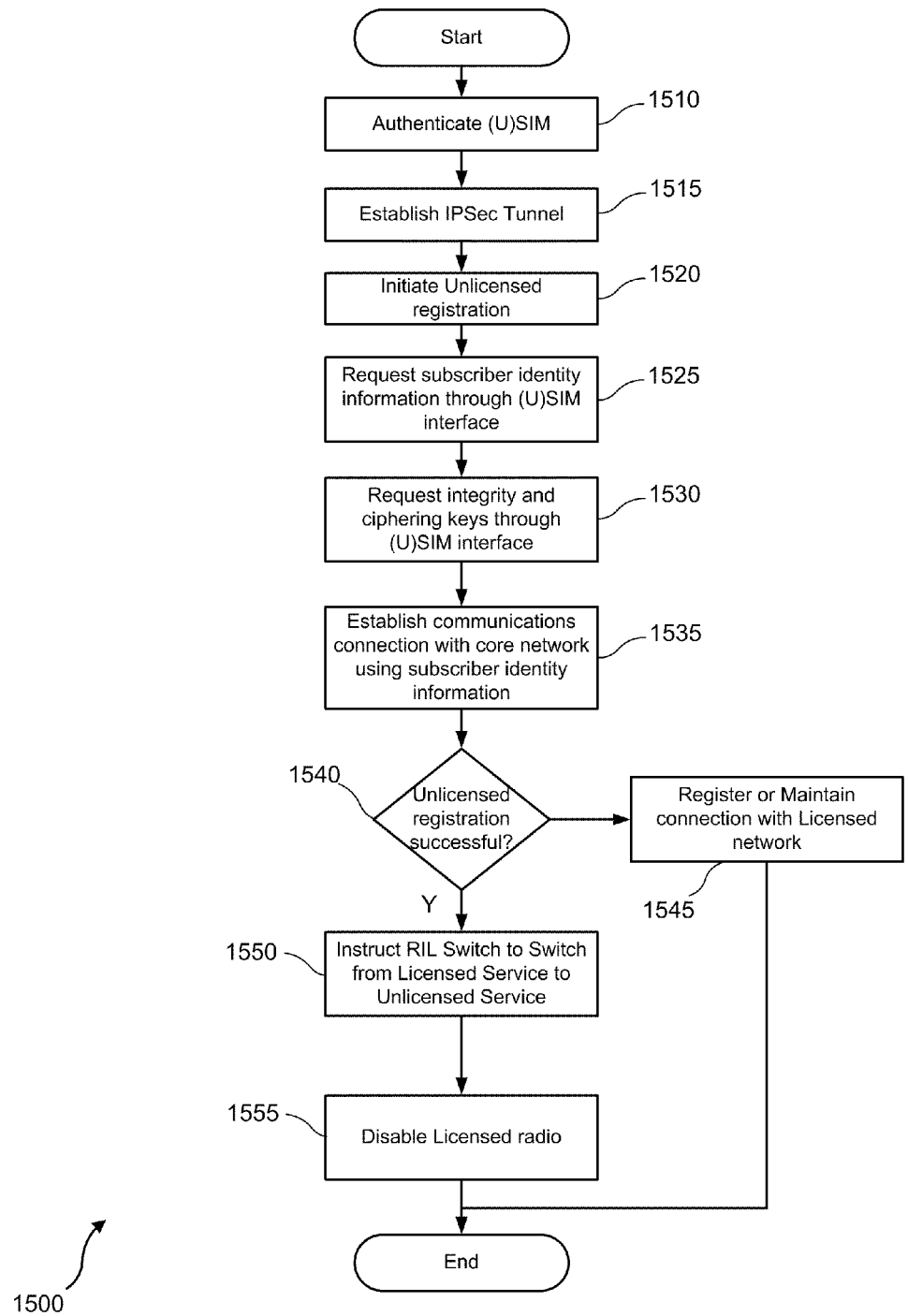
FIG. 15 illustrates rove in process of a UE according to some embodiments of the present invention.

FIG. 15 illustrates an unlicensed (e.g., GAN) registration and rove-in process 1500 according to some embodiments of the present invention. In some embodiments, UE 705 constantly monitors the availability or health status of the Wi-Fi services (or unlicensed wireless frequencies services). In some embodiments, the rove in process starts after Wi-Fi services are available and only when the preference of UE 705 is set to Wi-Fi services rather than licensed wireless services. As shown, process 1500 authenticates (at 1510) the (U)SIM card and functions. Next, process 1500 establishes (at 1515) a secure association with a network controller such as a UMA network controller (UNC) or a generic access network controller (GANC). In some embodiments, the secure association is an IPSec tunnel.

Process 1500 then initiates (at 1520) the unlicensed registration process using unlicensed wireless client 735 of unlicensed radio interface 725. Next, the process requests (at 1525) the subscriber identity or IMSI stored in the (U)SIM card through (U)SIM access interface 1310 in order to start the GSM and EAP (Extensible Authentication Protocol) authentication procedures. Next, the process also requests (at 1530) for data stored in the (U)SIM such as authentication and ciphering keys and LOCI information, which is information relating to a particular location of UE 705.

Next, process 1500 establishes (at 1535) a secure communication channel between UE 705 and CN 645 using the subscriber identity (IMSI data) of the (U)SIM card. Process 1500 then determines (at 1540) whether the registration with the network controller (e.g., UNC or GANC) is successful. When the registration is not successful, process 1500 registers UE 705 (at 1545) with the cellular network. Alternatively, if UE 705 has already been registered with the cellular network, then process 1500 maintains (at 1545) connection with the cellular network. The process then ends.

On the other hand, when the unlicensed registration is successful, process 1500 instructs (at 1550) RIL switch 715 to switch to unlicensed service from cellular service. At this time the UE is able to use the services of the CN 645 through the unlicensed wireless link 650 and the network controller 665. Process 1500 then optionally disables (at 1555) the cellular radio components of UE 705 to conserve power. Alternatively, the cellular radio components may be placed in low power or sleep mode. The process then ends.

As discussed in the foregoing paragraphs, UE 705 is able to connect to CN 645 using either licensed wireless frequency of the cellular network or unlicensed broadband frequencies with a single UE identity. This eliminates the need to have a separate Wi-Fi application having separate identifier, dialer application, contact list, and SMS/MMS application. In this manner, the user of UE 705 may switch between the cellular network and the unlicensed wireless network seamlessly without having to use different phone numbers and contact lists.

One of ordinary skill in the art will recognize that process 1500 is a conceptual representation of the unlicensed or GAN registration and rove-in process. The specific operations of process 1500 may not be performed in the exact order described or different specific operations may be performed in different embodiments. Also, process 1500 may not be performed as one continuous series of operations. Furthermore, process 1500 could be implemented using several sub-processes, or as part of larger macro-process.

B. Rove Out

Figure 16:
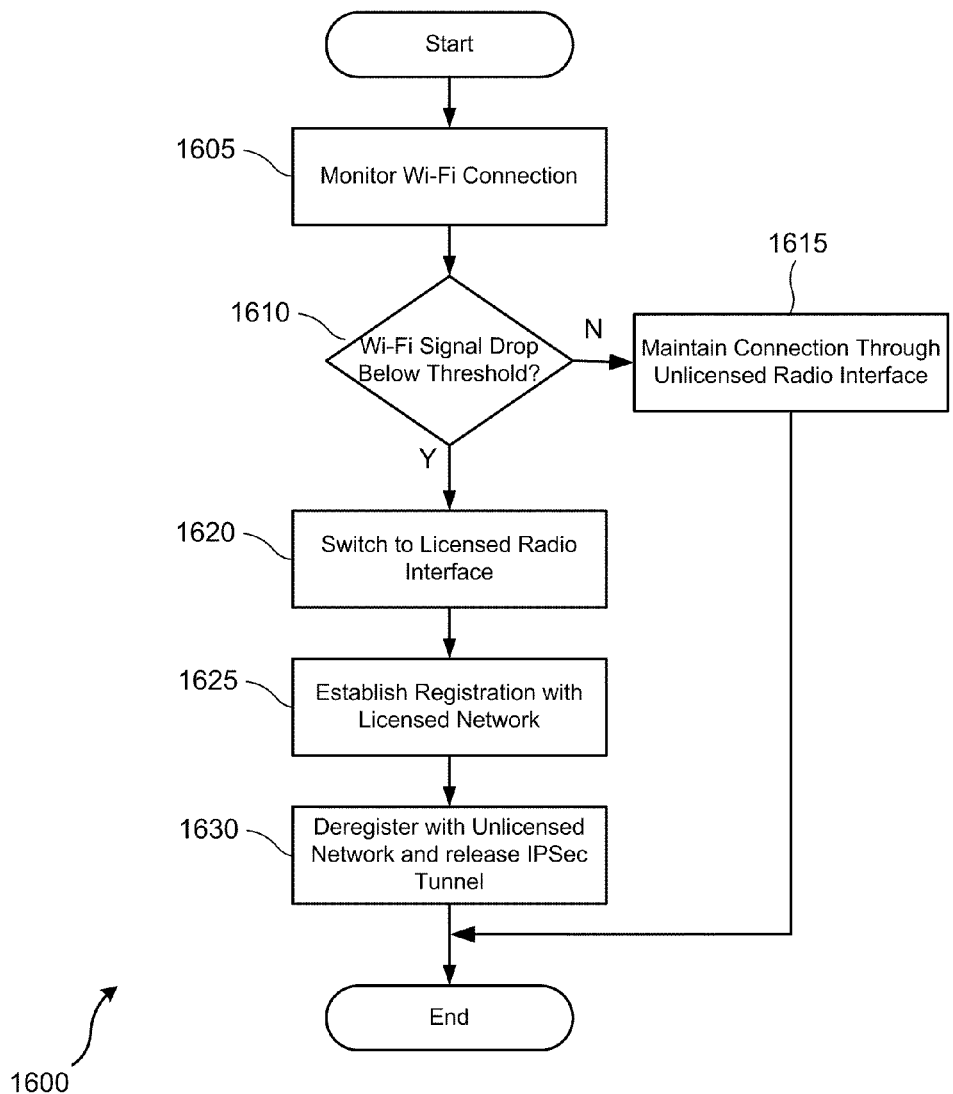
FIG. 16 illustrates an unlicensed wireless connection monitoring and GAN de-registration process of a UE according to some embodiments of the present invention.

FIG. 16 conceptually illustrates a rove out process 1600 of UE 705 according to some embodiments of the present invention. When UE 705 is operating using unlicensed RAT, process 1600 continuously monitors (at 1605) the Wi-Fi signal quality. The Wi-Fi signal quality may be affected by various factors such as roaming by UE 705 or bandwidth overload at the broadband access point. Next, the process determines (at 1610) whether the Wi-Fi signal quality drops below a certain threshold. When the quality is not below the threshold, process 1600 maintains (at 1615) connection with the unlicensed wireless network. If, however, the Wi-Fi signal quality drops below a certain threshold, process 1600 switches (at 1620) to using licensed radio interface by detaching the NAS CS & PS services. Once the detachment is successful, RIL switch 715 switches to licensed radio interface. Process 1600 then registers (at 1625) UE 705 with the licensed wireless system. Next, process 1600 deregisters (at 1630) the UE from the unlicensed wireless system and releases (at 1630) the IPSec tunnel used for connecting the UE to the network controller 660. The process then ends.

One of ordinary skill in the art will recognize that process 1600 is a conceptual representation of a rove out process. The specific operations of process 1600 may not be performed in the exact order described or different specific operations may be performed in different embodiments. Also, process 1600 may not be performed as one continuous series of operations. Furthermore, process 1600 could be implemented using several sub-processes, or as part of larger macro-process.

C. Dropped Call

Figure 17:
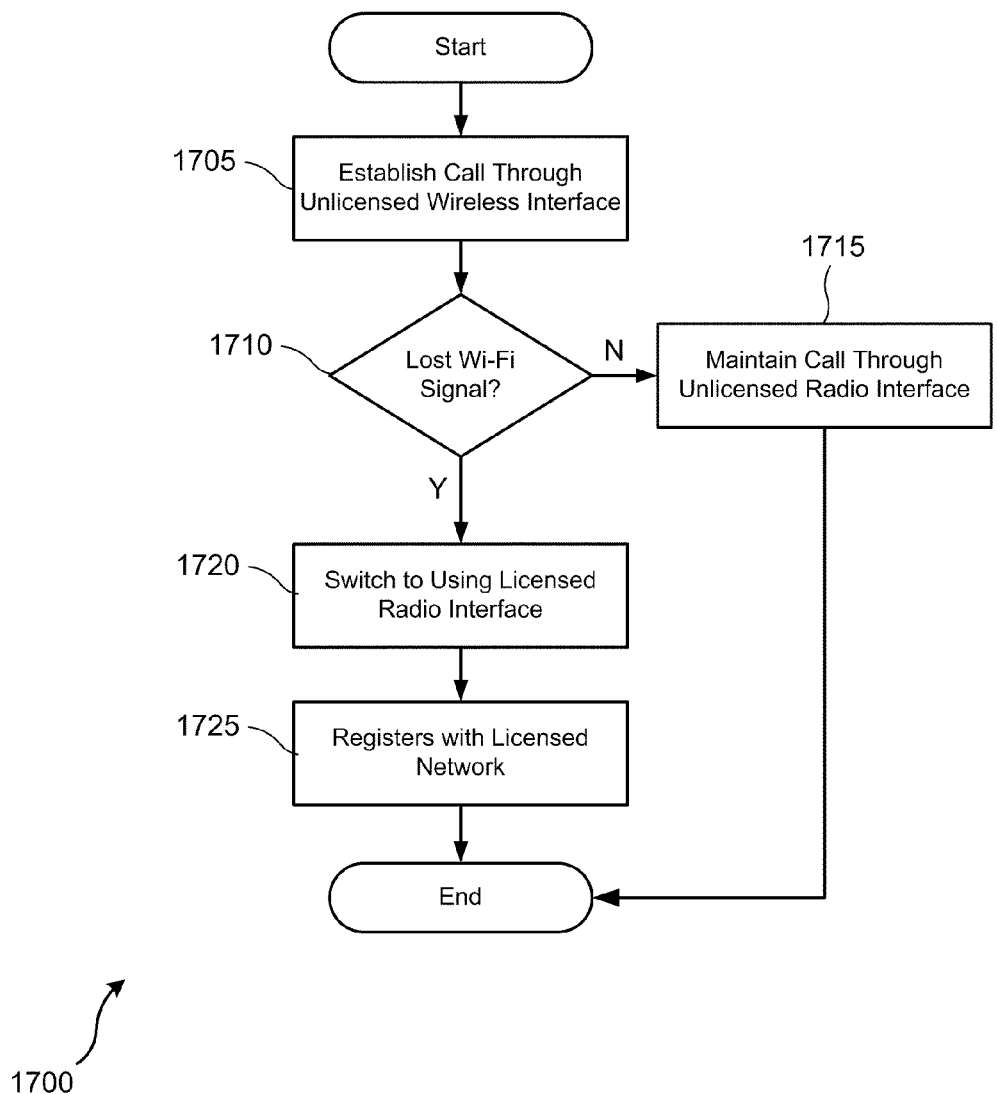
FIG. 17 illustrates a drop-call handling process of a UE according to some embodiments of the present invention.

FIG. 17 conceptually illustrates a process 1700 for handling a dropped call according to some embodiments of the present invention. Process 1700 starts with a call being established (at 1705) using unlicensed radio interface. Process 1700 monitors (at 1710) the Wi-Fi signal and determines (at 1710) whether the Wi-Fi signal has been lost. As long as the Wi-Fi signal is available, the process maintains (at 1715) the call through the unlicensed client. When the Wi-Fi signal is lost, process 1700 switches (at 1720) to using licensed radio interface by instructing RIL switch 715 to switch to the licensed wireless network. Next, process 1700 registers with the cellular network. The process then ends.

One of ordinary skill in the art will recognize that process 1700 is a conceptual representation of a dropped call handling process. The specific operations of process 1700 may not be performed in the exact order described or different specific operations may be performed in different embodiments. Also, process 1700 may not be performed as one continuous series of operations. Furthermore, process 1700 could be implemented using several sub-processes, or as part of larger macro-process.

D. Handout

Figure 18:
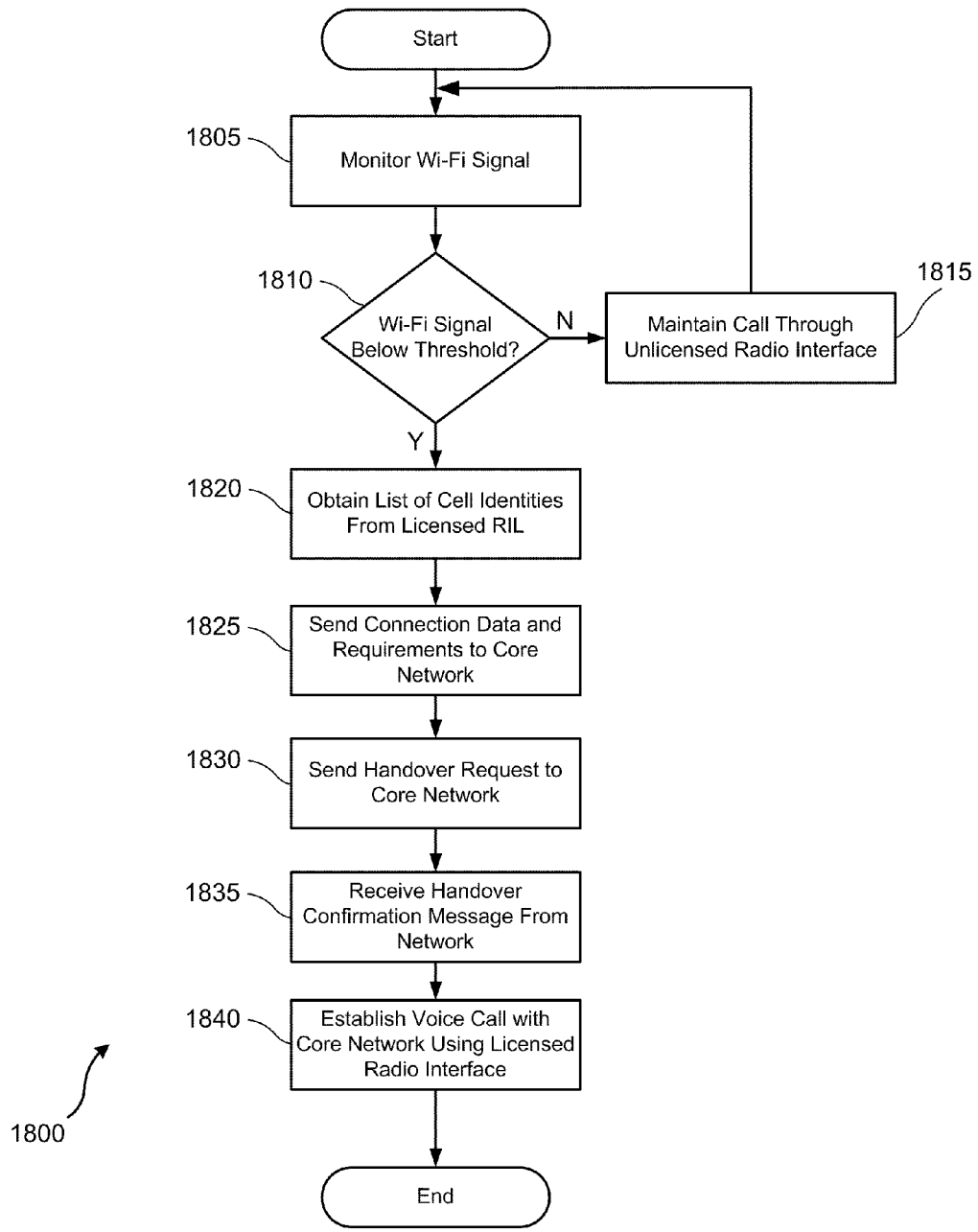
FIG. 18 illustrates a handout process of a UE according to some embodiments of the present invention.
Figure 19:
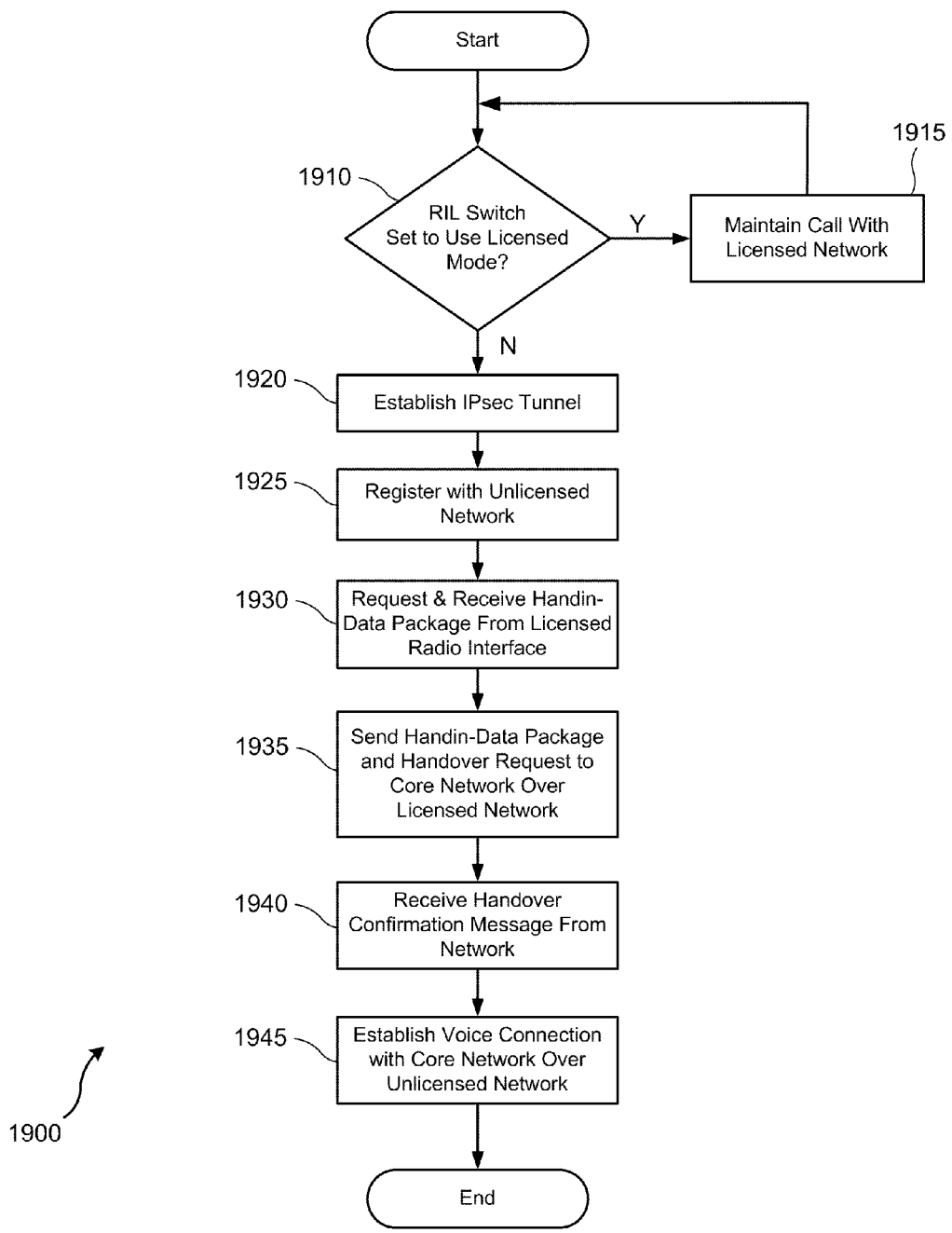
FIG. 19 illustrates a hand-in process of a UE according to some embodiments of the present invention

FIG. 18 conceptually illustrates a handover process 1800 for handing out of an ongoing call from the unlicensed wireless communication system to the licensed wireless communication system according to some embodiments of the present invention. Process 1800 starts by monitoring (at 1805) the Wi-Fi signal. Next, process 1800 determines (at 1810) whether the Wi-Fi signal has dropped below a certain threshold. The Wi-Fi signal may be affected by various problems such as radio interference, network issues, and external noise.

When the Wi-Fi signal is above the threshold, process 1800 maintains (at 1815) the call with the core network via unlicensed radio interface 725 using unlicensed wireless communication frequencies. The process then proceeds to 1805 to keep on monitoring Wi-Fi signal. Otherwise, process 1800 commences (at 1820-1840) the handover procedure.

The handover procedure starts by obtaining (at 1820) a list of cell identities of service region of the licensed wireless network. In some embodiments, the list of cell identities comprises cell identities of GERAN (GSM Edge Radio Access Network) cell. In some embodiments, unlicensed wireless client 735 makes a direct request to the cellular RIL of mobile device 705 for the list of cell identities.

Process 1800 then sends (at 1825) connection data and requirements to the core network using the unlicensed wireless network. The connection data and requirements may include the list of cell identities and connection requirements such as channel information, channel mode, ciphering codes, etc. Next, process 1800 sends (at 1830) a handover request to the core network using the unlicensed network. Procedures 1825 and 1830 may be implemented together or concurrently. In some embodiments, the handover request message includes the connection data and requirements. In other words, the connection data and requirements of operation 1825 may be embedded in the handover request message.

Next, process 1800 receives (at 1835) the handover confirmation message from the core network via the unlicensed wireless network. The handover confirmation message may include timing information to help synchronize the handover of the current call using unlicensed radio interface over to licensed radio interface. Once the handover confirmation message is received, process 1800 establishes (at 1840) a voice connection with the core network using the licensed radio interface and hands over the ongoing call to the licensed wireless communication system. Then process then ends.

One of ordinary skill in the art will recognize that process 1800 is a conceptual representation of a handover process. The specific operations of process 1800 may not be performed in the exact order described or different specific operations may be performed in different embodiments. Also, process 1800 may not be performed as one continuous series of operations. Furthermore, process 1800 could be implemented using several sub-processes, or as part of larger macro-process.

E. Hand-In

FIG. 1900 conceptually illustrates a hand-in process 1900 for a hand-in of an ongoing call from the licensed wireless communication system to the unlicensed wireless communication system according to some embodiments of the present invention. As shown, Process 1900 determines (at 1910) whether unlicensed wireless services shall be used. In some embodiments, process 1000 (described above) determines whether the licensed or unlicensed services are to be used and sets the RIL switch to direct traffic flow to either the licensed radio interface or the unlicensed radio interface.

When the licensed wireless services are to be used, process 1900 maintains (at 1915) the call with the licensed communication network. The process then proceeds to 1910 to continue monitor whether the unlicensed services shall be used. On the other hand, when the signal strength is above a certain threshold, process 1900 establishes (at 1920) an IPSec tunnel with a network controller (such as a UNC or GANC). In some embodiments, when a call is ongoing, the call is handed-in to a Wi-Fi system only when the UE can automatically connect to the Wi-Fi system (e.g., without requiring the user to enter a password or to enter a credit card number). Next, process 1900 registers (at 1925) with the unlicensed network controller.

Process 1900 then requests (at 1930) from licensed radio interface 720 for a data package that contains data necessary for the hand-in. This data package may be referred to as a hand-in data package which may include channel information, channel mode, ciphering codes. In some embodiments, process 1900 receives (either automatically or upon request by the unlicensed wireless client 735) the hand-in data packages as a message from the licensed radio interface. Once the hand-in data package is received, process 1900 sends (at 1935) the hand-in data package along with a handover request to the core network over the licensed network.

Next, process 1900 receives (at 1940) a handover confirmation message from the core network. Process 1900 then establishes (at 1945) a voice connection with the core network over the unlicensed wireless network using information from the hand-in data package. In this manner, the transition from the licensed network to the unlicensed network is seamless.

One of ordinary skill in the art will recognize that process 1900 is a conceptual representation of a hand-in process. The specific operations of process 1900 may not be performed in the exact order described or different specific operations may be performed in different embodiments. Also, process 1900 may not be performed as one continuous series of operations. Furthermore, process 1900 could be implemented using several sub-processes, or as part of larger macro-process.

V. UE Architecture

Figure 20:
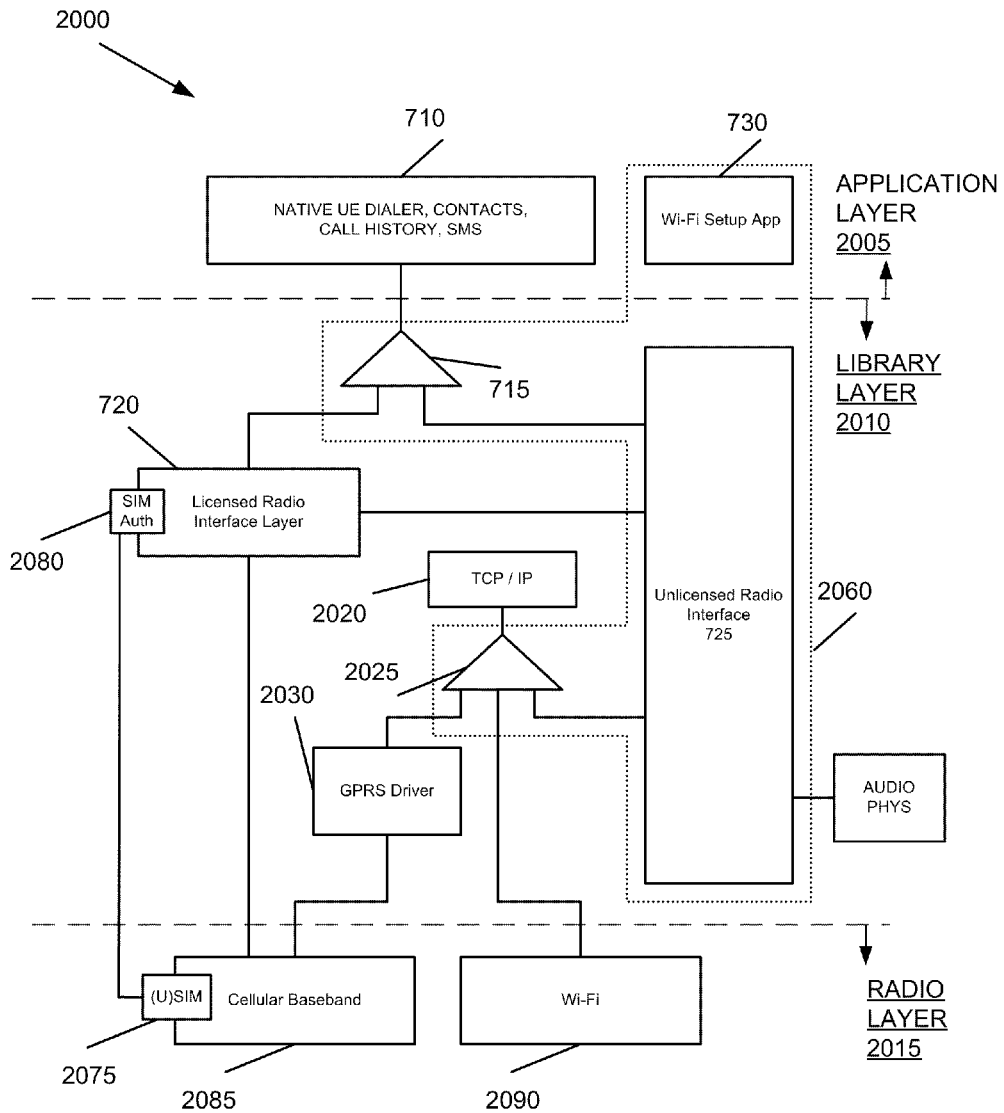
FIG. 20 illustrates a high level architecture of the UE according to some embodiments of the present invention.

FIG. 20 illustrates an exemplary architecture of a dual mode UE 2000 according to some embodiments of the present invention. As shown, UE 2000 includes an application layer 2005, a library (or OS) layer 2010, and a radio (or physical) layer 2015. Application layer 2005 includes native applications 710 and Wi-Fi setup application 730 as described by reference to FIG. 7. In some embodiments, Wi-Fi setup application 730 enables the unlicensed wireless client (part of unlicensed radio interface 725) to use one or more functionalities of native applications 710 such as the dialer, contact list, and SMS/MMS services. In some embodiments, Wi-Fi setup application 730 interacts with unlicensed wireless client via a Java native interface (JNI) of UE 705. It should be noted that other programming language interface might also be used to facilitate communication between setup application 730 and unlicensed wireless client. The unlicensed wireless client is described further below by reference to FIG. 21.

Library layer 2010 includes native licensed radio interface layer 720 with embedded SIM authentication algorithms 2080 for authenticating the (U)SIM 2075. Library layer 2010 also includes RIL switch 715, TCP/IP stack 2020, a Data Switch (or GPRS data switch) 2025, a GPRS driver 2030, and unlicensed radio interface 725. In some embodiments, unlicensed radio interface 725 includes unlicensed RIL 727, unlicensed wireless client 735, unlicensed virtual interface 2150, a SIM interface, Baseband interface, WLAN module, and other modules in such as status interface. These entities are described further below by reference to FIG. 21.

System 2000 also includes, at the radio layer 2015, a cellular transceiver 2085 and a Wi-Fi transceiver 2090. Components that are within dotted area 2060 as shown in FIG. 20 are non-native components. These non-native or new components are added to the UE in some embodiments to implement the processes and systems described above.

Figure 21:
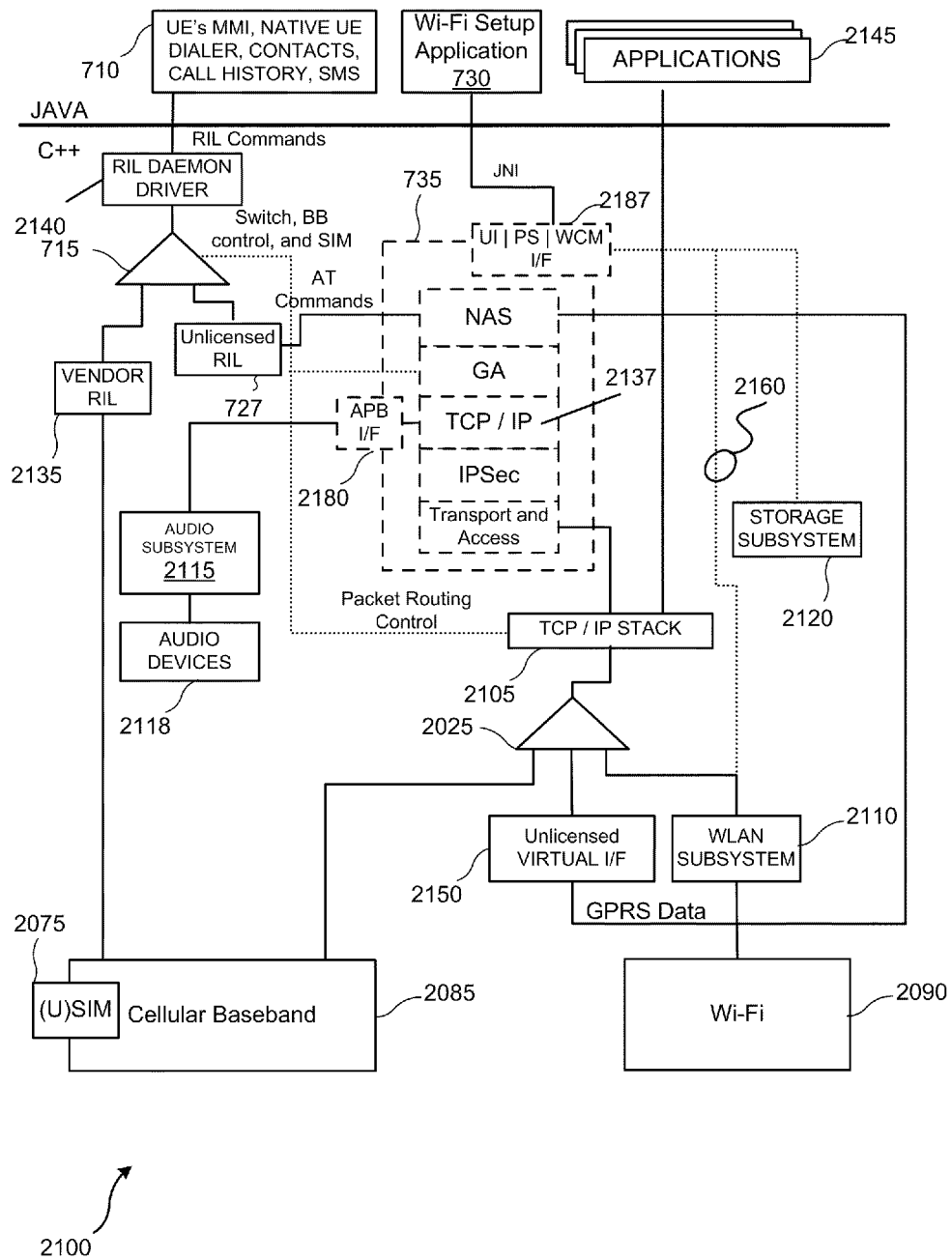
FIG. 21 illustrates a detailed level architecture of the UE according to some embodiments of the present invention.

FIG. 21 conceptually illustrates the detailed architecture of a dual mode UE 2100 according to some embodiments of the present invention. UE 2100 may include one or more components of system 2000. As shown, UE 2100 includes unlicensed RIL 727 directly coupled to RIL switch 715. The AT commands output of unlicensed RIL 727 is received by the NAS protocol layer of the unlicensed wireless client 735. AT commands are commands supported by GSM/GPRS modems and mobile phones.

In some embodiments, the unlicensed RIL 727 is eliminated and commands from the native interface 710 are directly passed through the RIL switch 715 to the unlicensed wireless client 735. In these embodiments, the NAS layer of the unlicensed wireless client 735 is configured to recognize the commands from the native interface 710. In some embodiments, non-voice data is forwarded to unlicensed virtual interface 2150 via a TCP/IP stack 2105. Unlicensed virtual interface 2150 allows PS (or GPRS) data to be routed to CN 645 using the unlicensed communication network. FIG. 21 shows two TCP/IP protocol stacks. TCP/IP stack 2105 is the native TCP/IP stack of the UE 2100. TCP/IP stack 2137 is a part of unlicensed wireless client 735 which connects the upper layers (e.g., NAS and generic access (GA) layers) of unlicensed wireless client 735 protocol stack to the lower layers (e.g., IPSec, transport, and access layers) of unlicensed wireless client 735 protocol stack.

When Wi-Fi setup application 730 is downloaded and installed on UE 2100, one or more communication application programming interfaces (APIs) are also installed to enable unlicensed wireless client 735 to communicate with various components of UE 2100. In some embodiments, the APIs may be part of Wi-Fi setup application 730 or unlicensed wireless client 735. In other embodiments, the APIs are separate software entities. In some embodiments, the APIs enable unlicensed wireless client 735 to communicate with the following components of UE 2100: RIL switch 715, WLAN subsystem 2110, audio subsystem 2115, storage subsystem 2120, (U)SIM 2075, cellular based band 2085, user interface (i.e., the man machine interface, MMI) of the UE, and data switch 2025. In some embodiments, a separate communication API is installed to enable communication between unlicensed wireless client 735 and each of the components described above.

In some embodiments, Wi-Fi setup application 730 can be downloaded and installed or comes as a pre-installed application. Wi-Fi setup application 730 may be downloaded via a software upgrade and installed on UE 2100 application layer. Alternatively, a third party or the OEM may install Wi-Fi setup application 730 onto UE 2100 prior to releasing it to consumers. In some embodiment, Wi-Fi setup application 730 includes an interface for interacting with unlicensed wireless client 735. In addition, Wi-Fi setup application 730 includes source codes to enable communication between Wi-Fi setup application 730 and the RIL switch 715, unlicensed RIL 727, unlicensed virtual interface 2150, and RIL daemon configuration.

In some embodiments, the communication APIs enable RIL switch 715 to communicate with unlicensed wireless client 735, which requires certain types of services from RIL switch 715 as described below. In some embodiments, RIL switch 715 is located above the unlicensed radio interface Layer (RIL) 727 and an OEM licensed RIL (or vendor RIL) 2135.

OEM licensed RIL 2135 is responsible for proxying commands/responses between the MMI handler and the cellular baseband. For instance, in some embodiments the OEM licensed RIL 2135 converts the commands received from the native interface 710 through the RIL switch 715 into AT commands and sends them to the cellular baseband 2085. In some embodiments, OEM licensed RIL 2135 is a modified version of the native licensed radio interface layer 720 of the UE 2000 that implements the processes and systems described above.

RIL switch 715 is responsible for proxying commands/responses between the MMI handler and integrated unlicensed client RIL 727. Depending on whether Wi-Fi and broadband services are available and on the service preference of the user, RIL switch 715 may switch between cellular RAT or unlicensed RAT to access the core network based on instructions received from unlicensed wireless client 735.

One advantage of different embodiments of the present invention disclosed in this specification is that calls received through the licensed and unlicensed wireless paths are treated as calls received from a single line and are processed using the same logic. For instance, when a call is already in progress through the unlicensed wireless path and a second call is received, the UE handles the second call in a similar way that multiple calls are handled when the UE directly receives calls through the licensed wireless path (e.g., by playing a beep to the user indicating an incoming call, displaying an indication of the second incoming call to the user, or forwarding the call to a recording service). On the other hand, prior art dual mode UEs treat the unlicensed wireless path as a second added line. As a result, in prior art dual mode UEs, a second call received e.g., through the licensed wireless path while a call is in progress through the unlicensed wireless path has to be processed as a call received through a separate line.

In some embodiments, the communication APIs enable unlicensed wireless client 735 to communicate with WLAN subsystem 2110 of UE 2100. Wireless client 735 requires certain types of services from WLAN subsystem 2110, which are described below. In some embodiments, WLAN subsystem 2110 scans for Wi-Fi devices and associates itself with any available access points, without any involvement from unlicensed wireless client 735. In some embodiments, WLAN subsystem 2110 provides unlicensed wireless client 735 with an indication of Wi-Fi coverage only when there is Internet access. WLAN subsystem 2110 may also provide unlicensed wireless client 735 with an indication of Wi-Fi loss and Wi-Fi signal strength (e.g., through the interface 2160) in the form of a received signal strength indication (RSSI) message. The signal strength is used in some embodiments to e.g., perform rove-in or rove-out. For simplicity, FIG. 21 shows the interfaces between unlicensed wireless client 735 and storage subsystem 2120, WLAN subsystem 2110, and Wi-Fi setup application 730 as "user interface/persistent storage/Wi-Fi connection manager" interface (UI/PS/WCM I/F) 2187.

Once WLAN subsystem 2110 attaches itself to a specific Wi-Fi access point, WLAN subsystem 2110 of some embodiments provides the following information to unlicensed wireless client 735: IP address of WLAN subsystem 2110, the MAC address of the Wi-Fi access point, and the SSID of the Wi-Fi access point. WLAN subsystem 2110 may also have built in intelligence to put the Wi-Fi into low power state when packets are sent and receive infrequently (e.g., once every 5 minutes). Additionally, WLAN subsystem 2110 may have built in intelligence to control the scan rate of known Wi-Fi APs in certain location areas.

In some embodiments, the communication APIs also enable unlicensed wireless client 735 to communicate with audio subsystem 2115 of UE 2100. As shown, the unlicensed wireless client 735 communicates with audio subsystem 2115 through audio processing block interface (APB I/F) 2180. Wireless client 735 requires certain types of services from audio subsystem 2115, which are described below. In some embodiments, audio subsystem 2115 of UE 2100 includes the ability to access audio frame in either pulse-code modulation (PCM) or adaptive multi-rate (AMR) format, coordinate timing for uplink and downlink of audio streams, capture and playback audio simultaneously, and switch captured audio streams or playback streams between integrated audio device (internal speaker) and external wireless audio device such as a Bluetooth headset.

Figure 22:
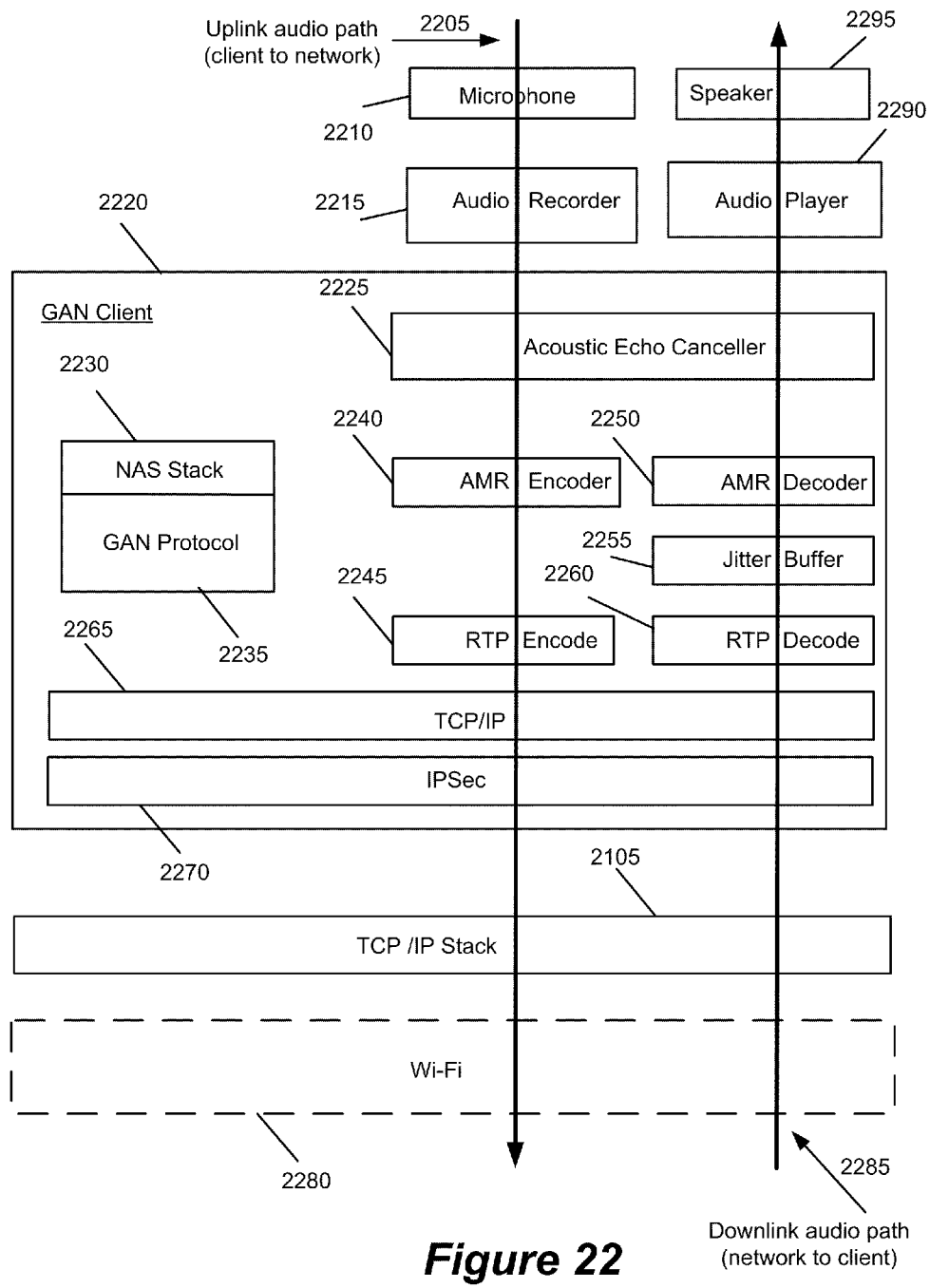
FIG. 22 illustrates the Wi-Fi audio path of some embodiments.

FIG. 22 illustrates the Wi-Fi audio path of some embodiments. As shown, the GAN client 2220 includes acoustic echo canceller 2225, AMR encoder 2240, AMR decoder 2250, jitter buffer 2225, RTP encode module 2245, RTP decode module 2260, TCP/IP protocol layer 2265, IPSec protocol layer 2270, NAS stack 2230, and GAN protocol layers 2235.

The uplink audio path 2205 receives audio signals from the microphone 2210 and records the audio using the audio recorder 2215. The GAN client 2220 cancels the echoes using acoustic echo canceller 2225 and encodes the audio using the AMR encoder 2240 and RTP encode module 2245. As shown, the encoded audio goes through GAN client's TCP/IP 2265 and IPSec 2270 protocol layers. The audio is passed to the Wi-Fi network 2280 through the TCP/IP stack 2105.

The downlink audio path 2285 receives the audio signal from the Wi-Fi network 2280 through the TCP/IP stack 2105 and the IPSec 2270 and TCP/IP protocol layers of GAN client 2220. The received signal is decoded by the RTP decode module 2260, jitter buffer 2255, and AMR decode module 2250. The decoded signal goes through acoustic echo canceller 2225 and is played by audio player 2290 through one or more speakers 2290.

Referring back to FIG. 21, the communication APIs also enable unlicensed wireless client 735 to communicate with (U)SIM 2075 in some embodiment. In some embodiments, the communication API includes a SIM access API that enables unlicensed wireless client 735 to have access to the following elementary files: EFimsi, EFacc, EFloci, EFepsloci, EFkeys, EFsms, EFsmsp, etc. In some embodiments, the SIM access API also generates integrity and ciphering keys and provides them to unlicensed wireless client 735 upon request. These keys are then used in the GSM and EAP-SIM authentication process. Other keys may also be generated by SIM access API such as confidentiality key, integrity key, xres and auts values. These keys may be used in the UMTS and EAP-AKA authentication process.

In some embodiments, the communication APIs also enable unlicensed wireless client 735 to communicate with licensed radio interface 720 (or the vendor RIL 2135) of UE 2100. In some embodiments, the communication API include a baseband control API that enables unlicensed wireless client 735 to detach the cellular baseband NAS from the cellular network before switching to the unlicensed wireless network. To accomplish this task, the integrated unlicensed wireless client 735 of some embodiments requests the cellular baseband NAS to deregister from the CS and PS services with the cellular network. Via the baseband control API, unlicensed wireless client 735 may request the cellular baseband NAS to become inactive. Conversely, unlicensed wireless client 735 may also request the cellular baseband NAS, via the baseband control API, to become active and search for cellular service. The cellular baseband NAS may then register for CS and PS services with the cellular network. In some embodiment, the integrated unlicensed wireless client 735 may query the cellular baseband on its current service state.

In some embodiments, the communication APIs also enable unlicensed wireless client 735 to communicate with the MMI of UE 705. In some embodiment, the communication API includes a status interface API that enables unlicensed wireless client 735 to pass GAN specific health status information to the devices MMI for optional display as well as probe the status of the mobile phone services (i.e. Call, SMS, and MMS). In some embodiments, the status interface API does not define or restrict how the actual end user MMI is updated, which is platform specific, and is managed by the MMI handler or other higher layer platform entities. However, the status interface API may receive or have access to status data from the MMI handler.

In some embodiments, the MMI handler updates the device MMI upon an indication of the GAN connection (unlicensed connection) status from unlicensed wireless client 735. The device MMI handler may map and pass to the device MMI the current unlicensed or GAN mode (GAN Service Zone Indicator, GAN Service Zone Name, and Location Status) upon indication from unlicensed wireless client 735 when GAN becomes the active RAT. The device MMI handler may also update the device MMI to turn the unlicensed mode display off upon indication from unlicensed wireless client 735 when cellular becomes the active RAT. Upon an error indication from unlicensed wireless client 735, the device MMI handler may map and pass the error indication to the device MMI. Additionally, the MMI handler may provide the status of the mobile phone services (i.e. Call, SMS, and MMS).

In some embodiments, the communication APIs also enable unlicensed wireless client 735 to communicate with storage subsystem 2120. In some embodiments, the communication API includes a storage interface that enables unlicensed wireless client 735 to read the latest unlicensed serving server information (e.g., the IP address of the network) upon power on. In this manner, the application does not need to relearn the serving server at each power cycle. Additionally, load on the unlicensed servers may also be reduced.

A shown in FIG. 21, UE 2100 includes a data switch 2025 which is a three way switch that routes data received from applications 2145 to either cellular baseband 2085, to Wi-Fi 2090 (i.e., unlicensed service) through the native WALN subsystem 2110 of the UE, or to Wi-Fi through the unlicensed virtual interface 2150. The unlicensed virtual interface also converts the packets from the IP stack to packets with format compatible with the unlicensed client. The unlicensed virtual interface also converts responses from the unlicensed client into format expected by the application MMI handler. In some embodiments, each of the foregoing interfaces is a software-based interface installed during the installation process of Wi-Fi setup application 730.

In some embodiments, data switch 2025 bypasses unlicensed virtual interface 2150 when routing data traffic between WLAN subsystem 2110 and applications 2145 (e.g. web browser, online games, etc.) of UE 2100. For example, gaming and web browsing applications go through the native WLAN subsystem 2110 of the UE. However, certain application activities do require going through the unlicensed wireless client and the unlicensed virtual interface 2150. For instance, one of the applications 2145 may require data to be replicated as cellular GPRS data in order to request usage statistics, account information, etc. from core network 645.

In some embodiments, voice received through audio devices 2118 is converted to audio frames and passed through audio subsystem 2115 and APB I/F 2180 to unlicensed wireless client 735. Packets related to voice are then passed through TCP/IP stack 2105 to data switch 2025. Data switch then passes (e.g., based on the way the packets are addressed by unlicensed wireless client 735) the packets to WLAN subsystem 2110 which passes them to the Wi-Fi system 2090.

In some embodiments, TCP/IP stack receives data from applications 2145. TCP/IP stack 2105 passes the data to data switch 2025 which in turn sends the data to unlicensed wireless client 735 through unlicensed virtual interface 2150. Unlicensed wireless client 735 processes the data and sends data packets to data switch 2025 through TCP/IP stack 2105. Data switch then passes (e.g., based on the way the packets are addressed by unlicensed wireless client 735) the packets to WLAN subsystem 2110 which passes them to the Wi-Fi system 2090.

As shown in FIG. 21, unlicensed wireless client 735 includes various application stacks such as NAS, generic access (GA) such as GA-RC, GA-CSR, GA-PSR, TCP/IP, IPSec, transport, and access protocol layers. Similar to system 2000, unlicensed wireless client 735 communicates with Wi-Fi setup application 730 via a JNI interface. In some embodiments, the UE includes a RIL daemon driver 2140 to make the native applications/modules compatible with new modules/interfaces provided herein. It should be noted that UEs made by different OEMs might use different RIL daemon drivers. These RIL daemon drivers are modified in some embodiments e.g., to connect the native interface 710 to RIL switch 715 instead of directly connecting native interface to vendor RIL 2135).

VI. Process for Defining API and Interfaces for a Dual Mode User Equipment

Figure 23:
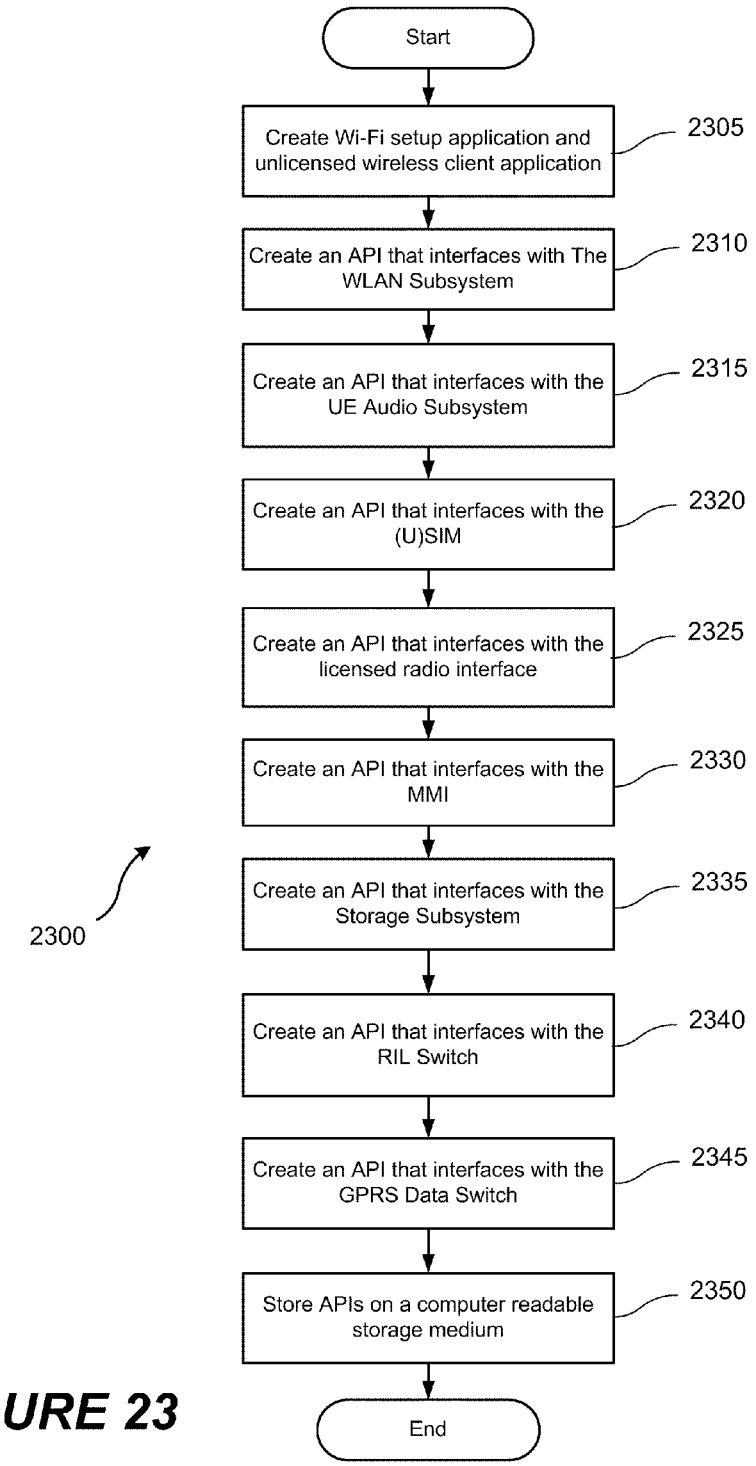
FIG. 23 illustrates an application programming interface (API) implementation process of a UE according to some embodiments of the present invention.

FIG. 23 conceptually illustrates a process 2300 of some embodiments for manufacturing a computer readable medium that stores the Wi-Fi setup application, the unlicensed wireless client, and various APIs described above. In some embodiments, the computer readable medium is a distributable CD-ROM. As shown, process 2300 begins by creating (at 2305) software modules (or applications) that have all of the functionalities of Wi-Fi setup application 730 and unlicensed wireless client 735. Next, process 2300 creates (at 2310) an API that enables unlicensed wireless client 735 to communicate with WLAN subsystem 2110. Process 2300 then creates (at 2315) an API that interfaces with audio subsystem 2115 to allow unlicensed wireless client 735 control of audio subsystem 2115.

Next, process 2300 creates (at 2320) an API that enables unlicensed wireless client 735 to communicate with (U)SIM 2075. This interface allows unlicensed wireless client 735 to retrieve various EFs data from the SIM installed in UE 705. Process 2300 then creates (at 2325) an API that enables unlicensed wireless client 735 to communicate with licensed radio interface 720 or vendor RIL 2135. This, for example, allows unlicensed wireless client 735 to request licensed radio interface 720 to deregister from the CS and PS services with the cellular network.

Process 2300 then creates (at 2330) an API that enables unlicensed wireless client 735 to communicate with the MMI (or user interface of native applications) of UE 705. In this manner, unlicensed wireless client 735 may graphically update the signal strength of Wi-Fi connection using the interface, for example.

Process 2300 then creates (at 2335) an API that enables unlicensed wireless client 735 to communicate with storage subsystem 2120. In this manner, unlicensed wireless client 735 can retrieve the latest unlicensed serving server information upon power on, for example. Next, process 2300 creates (at 2340) an API that enables unlicensed wireless client 735 to communicate with RIL switch 715. Process 2300 then creates (at 2345) an API that enables unlicensed wireless client 735 to communicate with data switch 2025.

Process 2300 then stores (at 2350) the created APIs and software modules on a computer readable storage medium. As mentioned above, in some embodiments the computer readable storage medium is a distributable CD-ROM. In some embodiments, the medium is one or more of a solid-state device, a hard disk, a CD-ROM, or other non-volatile computer readable storage medium.

VII. Computer System

One or more of the above-described methods are implemented as software processes that are specified as a set of instructions recorded on a computer readable storage medium (also referred to as computer readable medium). When these instructions are executed by one or more computational elements or processing units (such as processors or other computational elements like ASICs and FPGAs), they cause the computational element(s) to perform the actions indicated in the instructions. Computer can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" includes firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 24:
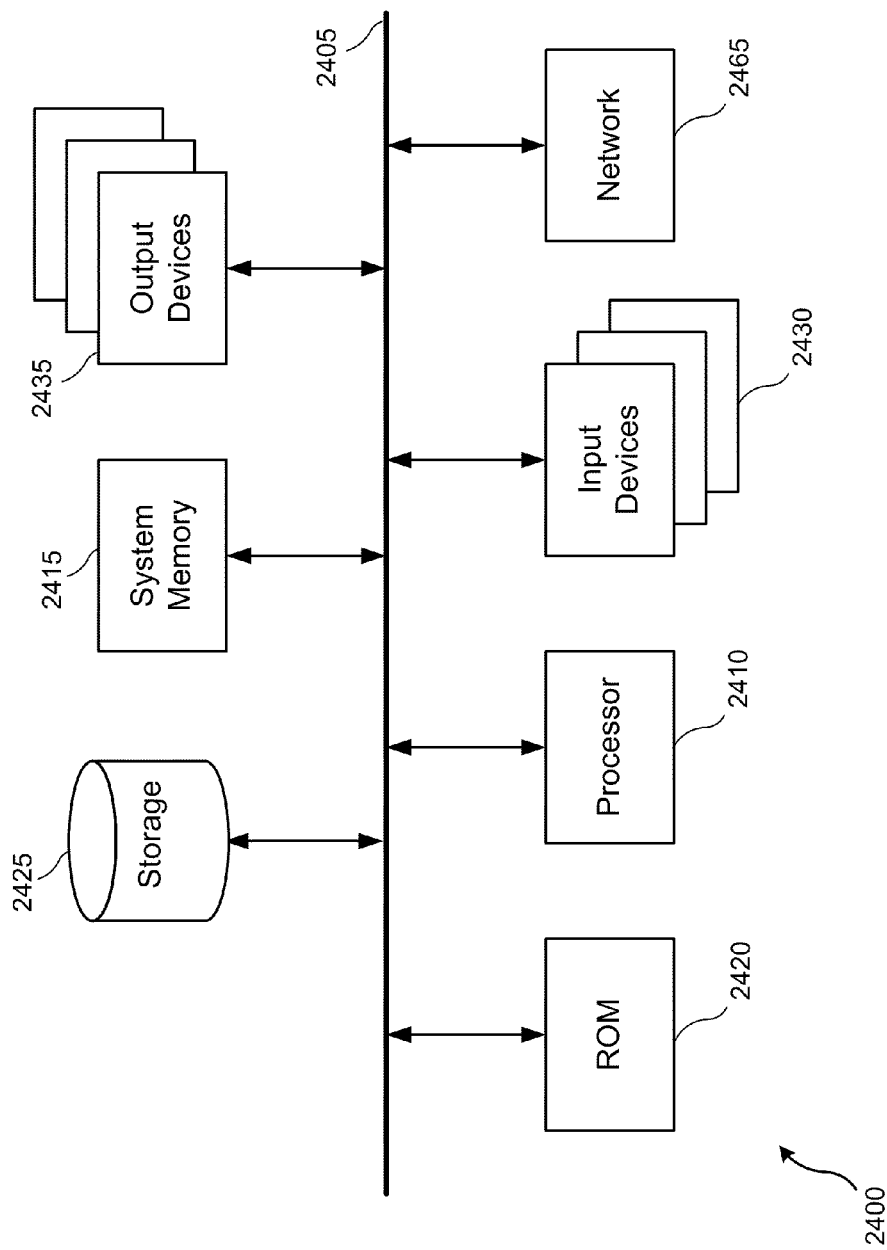
FIG. 24 illustrates a diagram depicting a computer system with which the UE can be implemented according to some embodiments of the present invention.

FIG. 24 conceptually illustrates a computer system with which some embodiments of the invention are implemented. The computer system 2400 includes a bus 2405, a processor 2410, a system memory 2415, a read-only memory 2420, a permanent storage device 2425, input devices 2430, and output devices 2435.

The bus 2405 collectively represents all system, peripheral, and chipset buses that support communication among internal devices of the computer system 2400. For instance, the bus 2405 communicatively connects the processor 2410 with the read-only memory 2420, the system memory 2415, and the permanent storage device 2425.

From these various memory units, the processor 2410 retrieves instructions to execute and data to process in order to execute the processes of the invention. In some embodiments the processor comprises a Field Programmable Gate Array (FPGA), an ASIC, or various other electronic components for executing instructions. The read-only-memory (ROM) 2420 stores static data and instructions that are needed by the processor 2410 and other modules of the computer system. The permanent storage device 2425, on the other hand, is a read-and-write memory device. This device is a non-volatile memory unit that stores instruction and data even when the computer system 2400 is off. Some embodiments of the invention use a mass-storage device (such as a magnetic or optical disk and its corresponding disk drive) as the permanent storage device 2425. Some embodiments use one or more removable storage devices (flash memory card or memory stick) as the permanent storage device.

Like the permanent storage device 2425, the system memory 2415 is a read-and-write memory device. However, unlike storage device 2425, the system memory is a volatile read-and-write memory, such as a random access memory. The system memory stores some of the instructions and data that the processor needs at runtime.

Instructions and/or data needed to perform processes of some embodiments are stored in the system memory 2415, the permanent storage device 2425, the read-only memory 2420, or any combination of the three. For example, the various memory units include instructions for processing multimedia items in accordance with some embodiments. From these various memory units, the processor 2410 retrieves instructions to execute and data to process in order to execute the processes of some embodiments.

The bus 2405 also connects to the input and output devices 2430 and 2435. The input devices enable the user to communicate information and select commands to the computer system. The input devices 2430 include alphanumeric keyboards and cursor-controllers. The output devices 2435 display images generated by the computer system. The output devices include printers and display devices, such as liquid crystal displays (LCD) or light emitting diodes (LED) displays. Finally, as shown in FIG. 24, bus 2405 also couples computer 2400 to a network 2465 through a network adapter (not shown). In this manner, the computer can be a part of a network of computers (such as a local area network ("LAN"), a wide area network ("WAN"), or an Intranet) or a network of networks (such as the Internet).

Any or all of the components of computer system 2400 may be used in conjunction with the invention. However, one of ordinary skill in the art will appreciate that any other system configuration may also be used in conjunction with the invention or components of the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

In some embodiments, some or all of the above described features are provided through one or more application programming interfaces (APIs). An API is an interface of a particular application that allows other applications to interact with the particular application or a part of the particular application. The particular application can be an operating system of a device, a framework that is a part of the operating system or runs on top of the operating system, or any other type of application that runs on the device. As known in the art, an application is a set of instructions that is executable to achieve one or more functions.

APIs are implemented differently in different embodiments. For instance, in some embodiments, an API is defined in terms of names of routines to call and/or objects to use by the other applications. For some or all of such names, an API can also be defined in terms of the parameters to send to and receive from such routines and/or objects. By using these names and parameters, a client application can access a particular application's functionality without requiring this functionality to be implemented within the client application and without requiring any further interoperability with the particular application.

Figure 26:
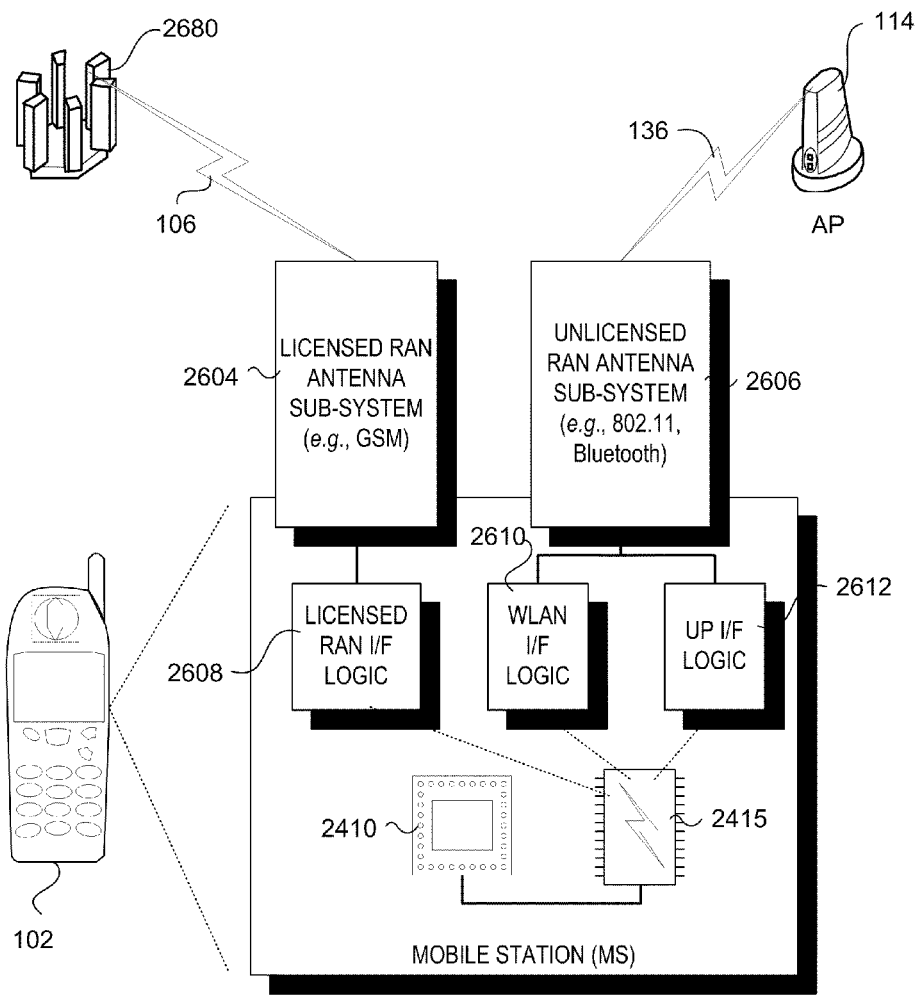
FIG. 26 is a schematic block diagram illustrating a high-level architecture of a user equipment in some embodiments.

FIG. 26 shows a block diagram illustrating a high-level architecture for one embodiment of a dual mode UE in some embodiments. The UE includes some or all components described above by reference to FIG. 24. As shown, the architecture includes a processor 2410 coupled to a non-volatile memory 2415, a licensed radio access network (RAN) antenna sub-system 2604 and an unlicensed RAN antenna sub-system 2606. Non-volatile memory 2415 is used to store software/firmware instructions for performing various functions and operations described herein. For simplicity, these functions and operations are depicted licensed RAN interface logic 2608, WLAN interface logic 2610, and Up interface logic 2612.

Licensed RAN antenna subs-system 2604 and licensed RAN interface logic 2608 are employed to facilitate conventional licensed RAN operations. For example, in some embodiments the licensed RAN comprises a GSM network, and thus these components facilitate normal GSM network operations typically employed by GSM-based cellular devices (e.g., one or more BTSs 2680) and the like. In other embodiments, licensed RAN comprises a UTRAN network and thus these components facilitate normal UTRAN network operations typically employed by UTRAN based cellular devices (e.g., one or more Node Bs 2680) and the like. Meanwhile, the unlicensed RAN antenna system 2606 and WLAN interface logic 2610 are used to support an unlicensed wireless channel (i.e., link) 136 with an access point 114 via which unlicensed wireless services may be accessed. In general, these blocks represent components and logic employed to support communications over an unlicensed wireless link. For example, these components are illustrative of components that may be employed to implement the IEEE 802.11 lower layers for an 802.11 link or Bluetooth lower layers for a Bluetooth link. The unlicensed interface logic 2612 (e.g., a Up interface logic depending on the protocol used between the UE and the unlicensed system) is used to provide the UE-side Up interface functions and operations described herein. This includes generating and processing various messages, as well as providing the various UP interface layers depicted described herein.

Figure 25:
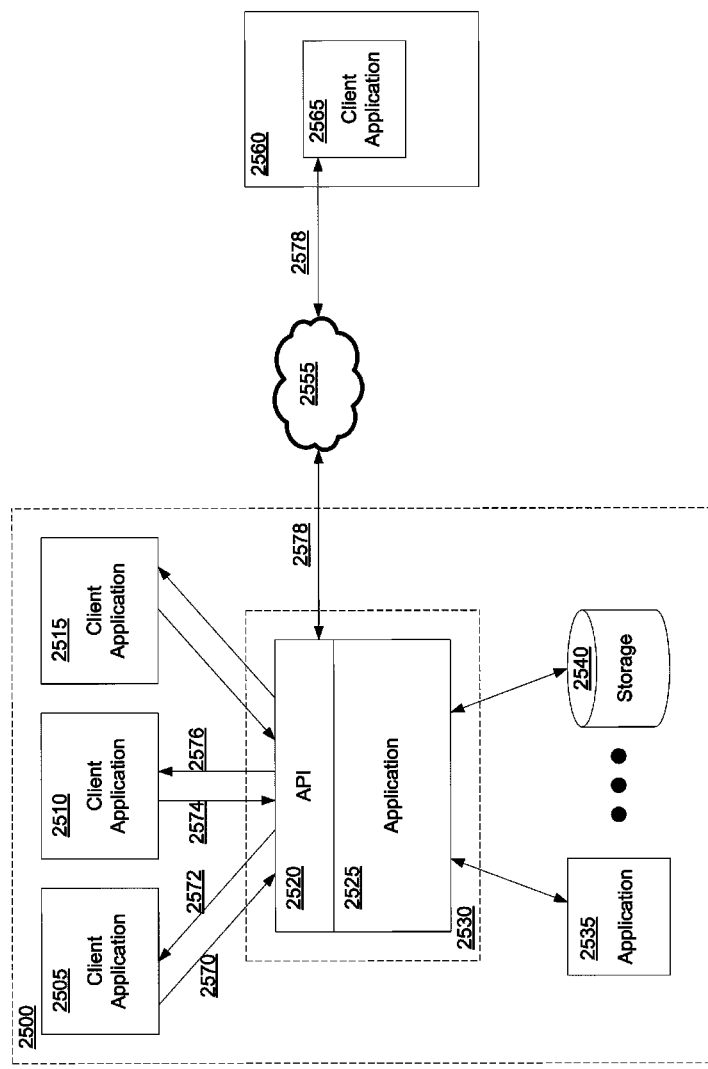
FIG. 25 illustrates a computing device that includes an application with an API that is used by multiple other applications in some embodiments.

FIG. 25 illustrates a computing device 2500 (such as a dual mode user equipment) that includes an application 2525 with an API 2520 that is used by multiple other applications. In this example, the API is accessed by client applications that operate on the computing device 2500 and by client applications that reside on other computing devices. Specifically, as shown in FIG. 25, the computing device 2500 includes client applications 2505, 2510 and 2515, the API 2520, and the application 2525. The computing device also includes one or more resources (such as an application 2535 and a data storage 2540) that can be directed by the application 2525 to perform a certain operation in response to an API call. As shown in FIG. 25, the computing device 2500 also connects to a remote device 2560 through a network 2555 (e.g., a local area network, a wide area network, or a network of networks, such as the Internet). Through this connection, a client application 2565 of the remote device 2560 can interact with the application 2525 through its API 2520.

As shown, client applications 2505, 2510, and 2515 access functionality provided by application 2525 through API 2520. Once called through its API 2520, the application 2525 can perform one or more actions, such as (1) performing an operation and returning a value, (2) directing another application to perform an operation, (3) accessing data storage, (4) directing a peripheral device to perform an operation, (5) communicating with another application or device through a particular protocol, etc.

FIG. 25 illustrates examples for some of these actions. For instance, as shown, an API call 2570 from client application 2505 can cause the application 2525 to perform an operation and return a value 2572 to the client application 2505.

FIG. 25 also illustrates an example of an API call 2574 from client application 2510 that directs the application 2525 to perform an operation with other resources on the computing device (such as the application 2535 and the data storage 2540), and/or one or more peripherals connected to the computing device (such as a printer, a scanner and a data storage). Once this operation has been completed, the application 2525 returns an acknowledgment 2576 to the client application 2510, for some of the API calls in some embodiments of the invention.

An API call can also be made to an application from a remote client application. FIG. 25 illustrates an example of such a remote call. Specifically, it illustrates an API call 2578 that is made to the application 2525 from the client application 2565 on the remote device 2560 through the network 2555.

VIII. Abbreviations
(U)SIM Universal Subscriber Identity Module
AAA Authentication Authorization Accounting
AMR Adaptive Multi-Rate
AP Access Point
API Application Programming Interface
AT Attention
BB Baseband
BSC Base Station Controller
BSS Base Station Subsystem
CBC Cell Broadcast Center
CN Core Network
CS Circuit Switched
EAP-AKA Extensible Authentication Protocol Method for UMTS Authentication and Key Agreement
EDGE Enhanced Data rates for GSM Evolution
EF Elementary Files
EFacc EF Access Control Class
EFepsloci EF EPS Location Information
EFimsi EF International Mobile Subscriber Identity
EFloci EF Location Information
EFsms EF Short Message Service
EFsmsp EF SMS Parameter
EFsmsr EF SMS reports
EFsmss EF SMS status
EPS Evolved Packet System
ESN Electronic Serial Number
GA Generic Access
GA-CSR Generic Access—Circuit Switched Resources
GA-PSR Generic Access—Packet Switched Resources
GA-RC Generic Access—Resource Control
GAN Generic Access Network
GANC GAN Controller
GERAN GSM EDGE Radio Access Network
GGSN Gateway GPRS Support Node
GPRS General Packet Radio Service
GSM Global System for Mobile Communications
ICS Integrated Communication System
IEEE Institute of Electrical and Electronics Engineers
IMSI International Mobile Subscriber Identity
IP Internet Protocol
IPSec Internet Protocol Security
MAC Media Access Control
MMI Man Machine Interface
MMS Multimedia Messaging Service
MSC Mobile Switching Center
NAS Non Access Stratum
OEM Original Equipment Manufacturer
PCM Pulse-Code Modulation
PCS Personal Communication Services
PS Packet Switched
RAT Radio Access Technology
RF Radio Frequency
RIL Radio Interface Layer
RNC Radio Network Controller
SEGW Security Gateway
SGSN Serving GPRS Support Node
SIM Subscriber Identity Module
SMLC Serving Mobile Location Center
SMS Short Message Service
SSID Service Set Identifier
TCP/IP Transmission Control Protocol/Internet Protocol
UE User Equipment
UMA Unlicensed Mobile Access
UMTS Universal Mobile Telecommunications System
UNC UMA Network Controller
UTRAN UMTS Terrestrial Radio Access Network
VLR Visitor Location Register
Wi-Fi Wireless Fidelity
WiMAX Worldwide Interoperability for Microwave Access
WLAN Wireless Local Area Network While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method for mobile communication, the method comprising:
   generating radio interface layer (RIL) commands in response to a command from a native dialer application of a mobile device, wherein the mobile device includes a first RIL for a licensed wireless communication network and a second RIL for an unlicensed wireless communication network, wherein the RIL commands include a subscriber identity and commands to cause the first RIL of the mobile device to establish a connection with a core network via the licensed wireless communication network, wherein establishing the connection with the core network by the first RIL includes authenticating, by the first RIL, the mobile device with the core network;
   determining that a RIL switch is set to use the unlicensed wireless communication network, said determination based at least on an availability of Wi-Fi services to the mobile device, wherein said RIL switch located between the native dialer application and said first RIL, and is located between the native dialer application and the second RIL of the mobile device;
   diverting, by the RIL switch, the RIL commands to the second RIL of the mobile device, wherein the second RIL is configured to establish the connection to the core network via the unlicensed wireless communication network in response to receiving the diverted RIL commands;
   receiving, by the second RIL, the diverted RIL commands from the RIL switch; and
   establishing, by the second RIL, the connection with the core network via the unlicensed wireless communication network using the subscriber identity and the diverted RIL commands, wherein establishing the connection with the core network by the second RIL includes authenticating, by the second RIL, the mobile device with the core network via the unlicensed wireless communication network.

2. The method of claim 1, wherein the method includes repackaging, by the second RIL, the diverted RIL commands into commands for establishing communication with the unlicensed wireless communication network.

3. The method of claim 1, wherein the first RIL comprises a vendor RIL configured to establish communication with the licensed wireless communication network.

4. The method of claim 1, wherein the second RIL is configured to i) perform non access stratum functions, ii) establish an IP transport to a network controller of the unlicensed wireless communication network, and iii) transfer data between the network controller and the second RIL over the established IP transport.

5. The method of claim 1, wherein the method includes activating the RIL switch in response to detecting the availability of the Wi-Fi services to the mobile device.

6. The method of claim 1, wherein the method includes accessing, by the second RIL, a subscriber identity module (SIM) access interface to obtain information for authenticating the mobile device with the core network, wherein the SIM access interface is accessed by the second RIL subsequent to receiving the diverted RIL commands.

7. The method of claim 6, wherein the method includes placing the first RIL in an reduced power consumption mode, and wherein the SIM access interface remains accessible to the second RIL while the first RIL is in the reduced power consumption mode.

8. The method of claim 1, wherein the method includes storing, at a storage subsystem accessible to the second RIL, information associated with a latest unlicensed serving server, wherein the information associated with a latest unlicensed serving server is used to establish the connection to the unlicensed wireless communication network.

9. A non-transitory computer readable medium storing a program for execution by at least one processor, the program comprising sets of instructions for:
generating radio interface layer (RIL) commands in response to a command from a native dialer application of a mobile device, wherein the mobile device includes a first RIL for a licensed wireless communication network and a second RIL for an unlicensed wireless communication network, wherein the RIL commands include a subscriber identity and commands to cause the first RIL of the mobile device to establish a connection with a core network via a licensed first wireless communication network, wherein establishing the connection with the core network by the first RIL includes authenticating, by the first RIL, the mobile device with the core network;
determining that a RIL switch is set to use the unlicensed wireless communication network, said determination based at least on an availability of Wi-Fi services to the mobile device, wherein said RIL switch located between the native dialer application and said first RIL, and is located between the native dialer application and the second RIL;
diverting, at the RIL switch, the RIL commands to the second RIL, wherein the second RIL is configured to establish the connection to the core network via the unlicensed wireless communication network in response to receiving the diverted RIL commands;
receiving, by the second RIL, the diverted RIL commands from the RIL switch; and
establishing, by the second RIL, a connection with the core network via an unlicensed second wireless communication network using the subscriber identity and the diverted RIL commands, wherein establishing the connection with the core network by the second RIL includes authenticating, by the second RIL, the mobile device with the core network via the unlicensed wireless communication network.

10. The non-transitory computer readable medium of claim 9, wherein the program includes instructions for repackaging, by the second RIL, the diverted RIL commands into commands for establishing communication with the unlicensed second wireless communication network.

11. The non-transitory computer readable medium of claim 9, wherein the first RIL comprises a vendor RIL configured to establish communication with the licensed first wireless communication network.

12. The non-transitory computer readable medium of claim 9, wherein the second RIL is configured to i) perform non access stratum functions, ii) establish an IP transport to a network controller of the unlicensed second wireless communication network, and iii) transfer data between an access point and the second RIL over the established IP transport.

13. A mobile device comprising:
at least one processor configured to provide a dialer application for generating radio interface layer (RIL) commands, the RIL commands comprising a subscriber identity and commands to cause a first RIL of the mobile device to establish a connection with a core network via a licensed first wireless communication network, wherein establishing the connection with the core network by the first RIL includes authenticating, by the first RIL, the mobile device with the core network;
an unlicensed wireless radio configured to communicate via an unlicensed wireless communication network;
a RIL switch to divert the RIL commands to an unlicensed wireless radio client based on a set of criteria comprising at least an availability of Wi-Fi services to the mobile device, wherein the RIL switch is located between the dialer application and the first RIL, and is located between the dialer application and the unlicensed wireless radio, wherein the unlicensed wireless radio is configured to establish the connection with the core network via the unlicensed wireless communication network using the subscriber identity and the diverted RIL commands, wherein establishing the connection with the core network by the unlicensed wireless radio includes authenticating, by the unlicensed wireless radio, the mobile device with the core network via the unlicensed wireless communication network; and
a memory coupled to the at least one processor.

14. The mobile device of claim 13, wherein the unlicensed wireless radio is configured to repackage the diverted RIL commands into generic access network (GAN) commands for establishing communication with the unlicensed wireless communication network.

15. The mobile device of claim 13, wherein the first RIL comprises a vendor RIL configured to establish communication with the licensed first wireless communication network.

16. The mobile device of claim 13, wherein the unlicensed wireless is configured to i) perform non access stratum functions, ii) establish an IP transport to a network controller of the unlicensed wireless communication network, and iii) transfer data between an access point and an unlicensed wireless radio client over the established IP transport.

17. The mobile device of claim 16, wherein the unlicensed wireless radio comprises a data switch coupled between an output of a TCP/IP stack and the unlicensed wireless radio client, the data switch configured to 1) replicate a cellular General Packet Radio Service (GPRS) interface, 2) convert data packets from IP stack to data packets compatible with the unlicensed wireless radio client, and 3) convert responses from the unlicensed wireless radio client into data format that is compatible with a man machine interface (MMI) of the mobile device.

18. The mobile device of claim 16, further comprising a Wi-Fi setup application configured to enable communication between the dialer application and the unlicensed wireless radio client in a library/OS layer of the mobile device, wherein dialer application operates within in an application layer of the mobile device.

19. The mobile device of claim 16, wherein the unlicensed wireless radio comprises a second RIL directly coupled between the RIL switch and the unlicensed wireless radio, the second RIL configured to 1) replicate functionalities of the first RIL, 2) convert the RIL commands into commands for the unlicensed wireless radio client, and 3) convert responses form the unlicensed wireless radio client to RIL commands.

20. The mobile device of claim 13, wherein the mobile device includes:
- an unlicensed virtual interface;
- a wireless local area network (WLAN) subsystem;
- a cellular baseband subsystem configured to transmit data to the core network via the licensed first wireless communication network;
- a Wi-Fi subsystem configured to transmit data via the connection to the unlicensed wireless communication network; and
- a data switch, wherein the data switch is coupled to the unlicensed virtual interface, the WLAN subsystem, and the cellular baseband subsystem, and wherein the data switch is configured to:
    - provide packets generated based on the diverted RIL commands to the unlicensed virtual interface;
    - provide non-cellular data packets to the WLAN subsystem; and
    - receive cellular data packets from the cellular baseband subsystem.

* * * * *

UNITED STATES PATENT AND TRADEMARK OFFICE
CERTIFICATE OF CORRECTION

| | | |
|---|---|---|
| PATENT NO. | : 9,265,073 B2 | Page 1 of 1 |
| APPLICATION NO. | : 12/977037 | |
| DATED | : February 16, 2016 | |
| INVENTOR(S) | : Mark Powell et al. | |

It is certified that error appears in the above-identified patent and that said Letters Patent is hereby corrected as shown below:

In the Claims:

At column 34, claim number 16, line number 50, after "wireless" add --radio--.

Signed and Sealed this
Seventeenth Day of May, 2016

Michelle K. Lee
*Director of the United States Patent and Trademark Office*